United States Patent
Ghit et al.

(10) Patent No.: US 10,672,067 B2
(45) Date of Patent: *Jun. 2, 2020

(54) BID ADVISING IN RESOURCE ALLOCATION DATA ANALYTICS FRAMEWORKS

(71) Applicant: International Business Machines Corporation, Armonk, NY (US)

(72) Inventors: Bogdan Ionut Ghit, Amstelveen (NL); Asser Nasreldin Tantawi, Somers, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 188 days.

This patent is subject to a terminal disclaimer.

(21) Appl. No.: 15/841,426

(22) Filed: Dec. 14, 2017

(65) Prior Publication Data

US 2018/0197234 A1    Jul. 12, 2018

Related U.S. Application Data

(63) Continuation of application No. 15/402,719, filed on Jan. 10, 2017.

(51) Int. Cl.
G06Q 30/00 (2012.01)
G06Q 30/08 (2012.01)
G06Q 10/06 (2012.01)

(52) U.S. Cl.
CPC ........... *G06Q 30/08* (2013.01); *G06Q 10/067* (2013.01)

(58) Field of Classification Search
CPC .............................. G06Q 30/06–08
(Continued)

(56) References Cited

U.S. PATENT DOCUMENTS 9,294,236 B1 * 3/2016 Ward, Jr. ................. H04L 1/20
2010/0088126 A1   4/2010 Iaia et al.
2010/0088205 A1   4/2010 Robertson

OTHER PUBLICATIONS

Ben-Yehuda, et al., "Deconstructing Amazon EC2 Spot Instance Pricing," ACM Transactions on Economics and Computation, Sep. 2013, vol. 1, Issue No. 3, 20 pages.

(Continued)

*Primary Examiner* — Ethan D Civan
(74) *Attorney, Agent, or Firm* — Amin, Turocy & Watson, LLP

(57) ABSTRACT

Techniques facilitating advising bid values for usage of resource in a resource allocation data analytics framework are provided. In one example, a computer-implemented method can include generating, by a system operatively coupled to a processor, one or more performance models. A performance model of the one or more performance models is associated with respective service classes for a resource of a computing infrastructure associated with a provider network and comprising one or more resources available for allocation. A service class of the respective service classes represents a performance differentiation compared to other ones of the respective service classes. The computer-implemented method can also include determining, by the system, a suggested bid value for the resource. The suggested bid value represents an expected performance metric of the resource as a function of a bid value and is based on the one or more performance models.

12 Claims, 23 Drawing Sheets

(58) Field of Classification Search
USPC .............................................. 705/26.1–27.2
See application file for complete search history.

(56) References Cited

OTHER PUBLICATIONS

Chohan, et al., "See Spot Run: Using Spot Instances for MapReduce Workflows," Proceedings of the 2nd USENIX Conference on Hot topics in Cloud Computing, 2010, 7 pages.
Javadi, et al., "Statistical Modeling of Spot Instance Prices in Public Cloud Environments," Fourth IEEE International Conference on Utility and Cloud Computing (UCC), 2011, pp. 219-228.
Menache, et al., "On-demand, Spot, or Both: Dynamic Resource Allocation for Executing Batch Jobs in the Cloud," 11th International Conference on Autonomic Computing (ICAC 14), Jun. 2014, pp. 177-187.
Feldman, et al., "A Price-Anticipating Resource Allocation Mechanism for Distributed Shared Clusters," Proceedings of the 6th ACM Conference on Electronic Commerce, 2005, pp. 127-136.
Nguyen, et al., "Weighted Proportional Allocation," Proceedings of the ACM Sigmetrics Joint International Conference on Measurement and Modeling of Computer Systems, Jun. 2011, pp. 173-184.
Costache, et al., "Merkat: a Market-based SLO-driven Cloud Platform," IEEE International Conference on Cloud Computing Technology and Science, 2013, pp. 403-410.
Non-Final Office Action received for U.S. Appl. No. 15/402,719 dated Jun. 27, 2019, 21 pages.
Office Action received for U.S. Appl. No. 15/402,719 dated Dec. 11, 2019, 18 pages.

* cited by examiner

| | B(x) | Gold | Silver | Chrome |
|---|---|---|---|---|
| User | Unknown | 1.5 | 3.5 | 9 |
| Model | Known | 1.4 | 3.3 | 25 |
| System | Learnt | 1.1 | 1.57 | 7 |

BID ADVISING IN RESOURCE ALLOCATION DATA ANALYTICS FRAMEWORKS

BACKGROUND

The subject disclosure relates to bid advising, and more specifically, bid advising in resource allocation data analytics frameworks.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate synchronization of processing components for bid advising in resource allocation data analytics frameworks are described.

According to an embodiment, a computer-implemented method can comprise generating, by a system operatively coupled to a processor, one or more performance models. A performance model of the one or more performance models can be associated with respective service classes for a resource of a computing infrastructure associated with a provider network and comprising one or more resources available for allocation. A service class of the respective service classes can represent a performance differentiation compared to other ones of the respective service classes. The computer-implemented method can also comprise determining, by the system, a suggested bid value for the resource. The suggested bid value can represent an expected performance metric of the resource as a function of a bid value and can be based on the one or more performance models.

According to an embodiment, a system can comprise a memory that stores computer executable components and a processor that executes computer executable components stored in the memory. The computer executable components can comprise a modeling component that can generate one or more performance models. A performance model of the one or more performance models can be associated with a respective service level agreement for a resource of a computing infrastructure associated with a provider network and comprising one or more resources available for allocation. A service level agreement of the respective service level agreements can represent a slowdown rate differentiation compared to other ones of the respective service level agreements. The computer executable components can also comprise a recommendation component that can determine a suggested bid value for the resource. The suggested bid value can represent a defined tolerance level for a slowdown rate of the resource as a function of a bid value and can be based on the one or more performance models.

According to another embodiment, a computer program product for facilitating bid advising for resource allocation can comprise a computer readable storage medium having program instructions embodied therewith. The program instructions are executable by a processing component. The program instructions can cause the processing component to receive a request for a resource of a computing infrastructure available for allocation. The program instructions can also cause the processing component to generate one or more performance models. A performance model of the one or more performance models can be associated with respective service classes for the resource of the computing infrastructure. A service class of the respective service classes can represent a performance differentiation compared to other ones of the respective service classes. Further, the program instructions can also cause the processing component to determine a suggested bid value for the resource based on a determined quality of service level.

DETAILED DESCRIPTION

Figure 1:
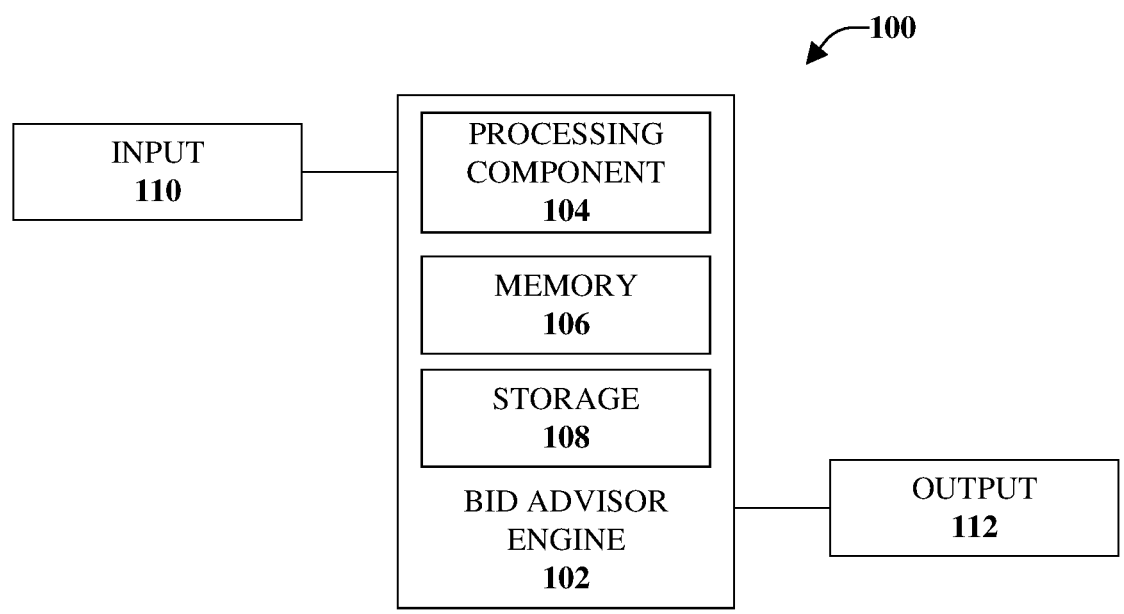
FIG. 1 illustrates a block diagram of an example, non-limiting system that facilitates bid advising in accordance with one or more embodiments described herein

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Various computing platforms, such as data centers or cloud computing environments, can have a multitude of compute and storage elements networked together that can be running data analytics workloads on software service frameworks. These frameworks can allocate resources of the computing platforms and can implement a resource allocation function as a means of selling resources of the computing platform owned by a service provider. Entities that desire use of a resource can submit bid values in order to use the resources of the service provider. The various aspects discussed herein provide suggested bid values that conform to quality of service, budgets, and other parameters identified by the bidding entity, while hiding from the bidding entity one or more performance characteristic of the computing infrastructure.

According to an aspect, the suggested bid value can be provided to mitigate the chances of an application of the bidding entity being preempted by applications of other bidding entities for use of the resources. For example, if the service provider runs out of resources, then the resources allocated to the bidding entity would be taken (e.g., another entity would preempt the bidding entity). In some cases, the bidding entity might not be preempted (e.g., returned to a waiting queue) but can be provided degraded performance, as specified in a service contract. For example, the service contract can indicate that the service provider provides resources from the infrastructure at an accepted price but at the risk of the bidding entity losing the resources allocated and/or receiving degraded performance.

The various embodiments discussed herein relate to assisting entities to determine a bid value for the resource while taking into account a quality of service level and/or a budget level. In some embodiments, the assistance can be provided with a bid advisor engine, which can be deployed by the service provider or can be deployed by another entity. The bid advisor engine can generate multiple models to determine that if an entity pays a certain amount, the entity can receive a certain quality of service with a high certainty level. This assists bidding entities because the entity can have goals and/or objectives, which can be budget related and/or a quality of service target, but, without knowing details related to performance characteristic of the computing infrastructure, a bid value to achieve those goals and/or objective cannot be determined.

One or more embodiments can provide data analytics entities bidding suggestions. For example, some embodiments can determine a mechanism for bidding that includes analyzing price history published by the service provider and targeting a bid value that would result in sustaining the allocated resources (e.g., mitigating preemption by other entities). In another example, various embodiments can determine a bid value that can be related to the budget constraints of the data analytics entity.

FIG. 1 illustrates a block diagram of an example, non-limiting system 100 that facilitates bid advising in accordance with one or more embodiments described herein. Aspects of systems (e.g., non-limiting system 100 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

In various embodiments, non-limiting system 100 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise non-limiting system 100 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated, non-limiting system 100 can comprise a bid advisor engine 102, a processing component 104, a memory 106, and/or a storage 108. In some embodiments, one or more of the bid advisor engine 102, the processing component 104, the memory 106, and/or the storage 108 can be communicatively and/or electrically coupled to one another to perform one or more functions of the system 100. In some embodiments, the bid advisor engine 102 can receive as input 110 request information regarding data analytics requirements (amount of service needed), target utilization rate, slowdown performance tolerance level, budget amount, job size, and so on. In accordance with an embodiment, the bid advisor engine 102, additionally or alternatively, can receive as input 110 capacity information related to a resource of a computing infrastructure associated with a provider network that has available one or resources available for allocation.

In accordance with an embodiment, the bid advisor engine 102 upon receiving the input 110 can generate one or more performance models. A performance model of the one or more performance models can be associated with a respective service class for the resource of the provider network. A service class of the respective service classes represents a performance differentiation compared to other ones of the respective service classes. For example, the bid advisor engine 102 can use the one or more performance models to predict a performance level of the resource based on an associated bid value. For example, a service class can indicate that a bid of p amount would result in a performance level of f; another service class can indicate that a bid of q amount would result in a performance level of g; yet another service class can indicate that a bid of r amount would result in a performance level of h where p, q, and r are integers and f, g, and h are indications of quality of a performance level. The predicted performance level can be used to determine whether a given resource can satisfy a service level agreement (SLA) requirement to meet expectations, while also determining and identifying a lowest bid amount to obtain the predicted performance level. The service class and associated bid amount can subsequently be output as output 112.

The predicted performance level can correspond to a service level agreement that can be available at a given bid value. The service level agreements can be ranked in order from a highest-ranked service level agreement that offers the quickest service and the maximum amount of resources, a lowest-ranked service level agreement that offers the slowest service and the minimum amount of resources, and one or more other service level agreements ranked between the highest-ranked and lowest-ranked service level agreements. It can be expected that the highest-ranked service level agreement can be the most expensive, the lowest-ranked service level agreement costs the least, and the cost for the service level agreements between the highest ranked and the lowest-ranked can be priced accordingly, however, the disclosed aspects are not limited to this implementation.

In some cases, the service level agreements can be ranked based solely on a slowdown rate associated with a respective level. For example, a data analytics entity that would like to purchase (for a limited amount of time) one or more computing resources can have a tolerance level associated with a wait time in order to obtain the usage of the resources and/or processing time to perform the computing functions. Based on this information, the bid advisor engine 102 can determine that a mid-level service agreement, which can be moderately priced would fulfill the computing needs without costing an excessive amount of money.

The input 110 can be received in various formats. For example, the data analytics entities can input the information based on providing an indication of the services needed. The indication can be a program that the data analytics entity desires to be executed within the software service framework. In this situation, the bid advisor engine 102 (or another component) can analyze the program to determine the capacity needs of the data analytics entity. In an example related to the available resources, the bid advisor engine 102 can be in direct contact with the service provider networks and can receive information related to current resources, capability, and network load. The bid advisor engine 102 can hide the service provider network information from the bidding entities.

The output 112 can be provided in any perceivable format. In an example, the output 112 can in the form of a visual representation that provides easily understandable information. For example, the data analytics user can be provided with more than one bid level for comparison. In some examples provided herein, the data analytics user can be provided three suggested bid amounts that correspond to three different levels of service. However, the various aspects provided herein are not limited to three and fewer or more suggested bid amounts can be provided.

According to some implementations, the bid advisor engine 102 can evaluate a performance model of the one or more performance models for conformance to a target utilization rate. Based on the performance model conforming to the target utilization rate, the output 112 can include a suggested bid value for obtaining the target utilization rate. In some implementations, the bid advisor engine 102 can evaluate a performance model of the one or more performance models for conformance to a slowdown performance tolerance level. Based on the performance model conforming to the slowdown performance tolerance level, the output 112 can include a suggested bid value for obtaining resources that outperform the slowdown performance tolerance level.

Based on the output 112 that includes one or more suggested bid values, an input 110 can be received for selection of one of the suggested bid values. As a result of the received selection, the system 100 can allocate the resource in response to the selection of one of the suggested bid values. In an example, the suggested bid value can be determined based on an evaluation of the performance model of the one or more performance models for conformance to the defined tolerance level for the slowdown rate.

The various embodiments can hide one or more performance characteristic of the computing infrastructure from the data analytics entities. Thus, although the one or more performance characteristics of the computing infrastructure can be known to the bid advisor engine 102, this information is not communicated to the data analytics entities. Various data can be hidden including, but not limited to, a bidding model current performance, loading on the system, how many nodes are on the system, and so on.

The system 100 and/or the components of the system 100 can be employed to use hardware and/or software to solve problems that are highly technical in nature (e.g., determine a bid value that conforms to a slowdown performance tolerance level based on a consideration of other entities attempting to access the resource and respective bid values attributed to the other entities; determine a bid value that conforms to a target utilization rate based on the amount of resources available and usage of one or more of the resources available by other entities; determine one or more bid values for access to a resource with an indication of a respective quality of service for the one or more bid values; determine one or more bid values for a resource to mitigate loss, at least temporarily, of the resource due to preemption by another entity; and determine a suggested bid value for the resource in order to increase a processing speed of usage of the resource), that are not abstract and that cannot be performed as a set of mental acts by a human. For example, one or more performance characteristic of the computing infrastructure can be hidden and, therefore a bid value that would achieve a preemptiveless status cannot be determined as a set of mental acts. In another example, since the one or more performance characteristic of the computing infrastructure can be hidden, determining a bid value to achieve a defined target utilization rate and/or a defined quality of service level cannot be determined as a set of mental acts. In addition, since the performance characteristics can be hidden, a status of other entities bidding on resources, the job size of the other entities, the bidding value of the other entities, and so on, are not known and, therefore, a bid value that would provide an increase in a processing speed of usage of the resource by the entity cannot be determined as a set of mental acts. Further, some of the processes performed can be performed by specialized computers for carrying out defined tasks related to the bid advising/resource allocation area. For example, a bid advisor engine can generate performance models to predict usage of resources of a computing infrastructure while hiding performance characteristics of the computing infrastructure from the bidding entities. Based on the generated performance models, the bid advisor engine can provide a suggested bid value to achieve a defined parameter (e.g., quality of service, budget constraint) while mitigating preemption of the resource by other entities. The system 100 and/or components of the system can be employed to solve new problems that arise through advancements in technology, computer networks, the Internet and the like. The system 100 can provide technical improvements to resource allocation by improving processing efficiency among processing components in a resource allocation system by providing a bid value that mitigates waiting in a queue before a job can be executed and/or mitigates the chances of the job being preempted by another job, reducing delay in processing performed by processing components in a resource allocation system, avoiding or reducing the likelihood of network bottlenecks between processing components in a resource allocation system by distributing a job among resources, and/or improving bandwidth utilization for a network of processing components in a resource allocation system, etc. According to some implementations, the resource allocation system can be a resource allocation system.

Figure 2:
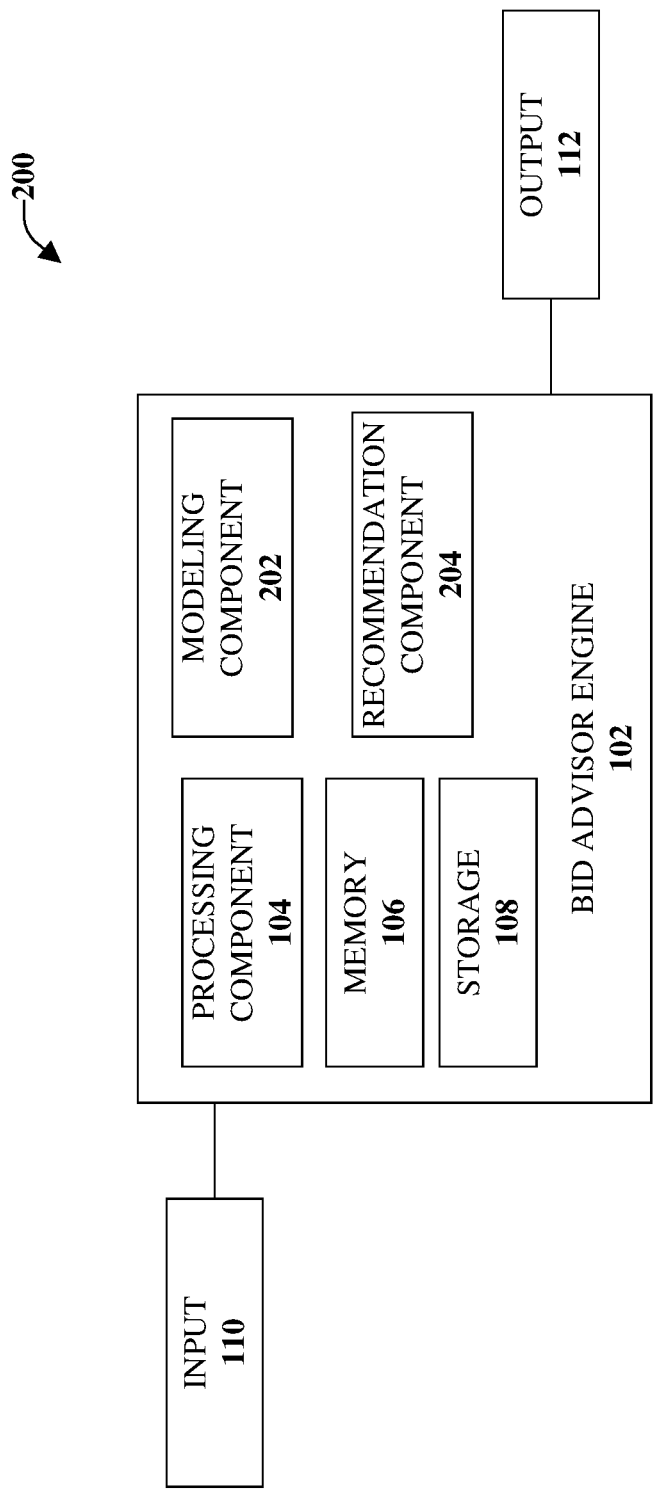
FIG. 2 illustrates a block diagram of an example, non-limiting system that facilitates bid advising in resource allocation data analytics frameworks in accordance with one or more embodiments described herein.

FIG. 2 illustrates a block diagram of an example, non-limiting system 200 that facilitates bid advising in resource allocation data analytics frameworks in accordance with one or more embodiments described herein. Repetitive description of like elements employed in other embodiments described herein is omitted for sake of brevity.

Non-limiting system 200 can comprise one or more of the components and/or functionality of system 100, and vice versa. As illustrated, the bid advisor engine 102 of system 200 can comprise a modeling component 202 that based at least in part on the input 110 determines an expected processing capability of one or more resources. For example, the input 110 can include historical data and/or new data, which the modeling component 202 can use to determine an expected processing capability.

The modeling component 202 can model various scenarios based on a bid value. For example, the modeling component 202 can determine a first expected processing capability available at a first bid value and a second expected processing capability available at a second bid value. Further, the modeling component 202 can determine subsequent expected processing capabilities available at subsequent bid values. The determination of the number of models or expected processing capabilities determined by the modeling component 202 can be selected based on defined criteria. In some implementations, the defined criteria can be determined based on entity preferences, tolerance levels, or based on other parameters.

As a result of the predicted processing capability as determined by the modeling component 202, a recommendation component 204 can provide a suggested bid value for the resource. The suggested bid value can include information about the value of the suggested bid in terms of an expected wait time.

The modeling component 202 can generate a bribing queue model, which can be an analysis of an abstract server upon which requests arrive according to a pattern of arrival and a respective request would bid respective values for the services. The requests would be placed in a queue, which can be ordered by the respective bid values. The entity that bids higher (e.g., pays more money) can advance in the queue and the bids that are lower (e.g., pay less money) can sit in the back of the queue. When a new arrival comes in, it can be inserted in right place in the queue in an order determined by the bid value. The first request in line can be the request that obtains the resources of the abstract server. The first request can use the abstract service until the job is complete. After completion, the first request can leave the abstract server (e.g., discontinues use of resources of the abstract server). If during its service, the first request is holding onto the server and a subsequent request comes in that has a higher bid value, the subsequent request can cause the first request to be pushed back onto the queue. Thus, the subsequent request preempts the first request back into the queue. When the subsequent request finishes using the abstract server, the first request can return to the abstract server and resume where it left off when it was preempted. The above described scenario is used as the model of entities. The request can be similar to a worker in this case and the bid value can be the bid value the entity bids for that worker. The preemption mechanism based on bid value can be implemented in the infrastructure.

The system 100 and/or the components of the system 100 can be employed to use hardware and/or software to solve problems that are highly technical in nature (e.g., determine a bid value that conforms to a slowdown performance tolerance level based on a consideration of other entities attempting to access the resource and respective bid values attributed to the other entities; determine a bid value that conforms to a target utilization rate based on the amount of resources available and usage of one or more of the resources available by other entities; determine one or more bid values for access to a resource with an indication of a respective quality of service for the one or more bid values; determine one or more bid values for a resource to mitigate loss, at least temporarily, of the resource due to preemption by another entity; and determine a suggested bid value for the resource in order to increase a processing speed of usage of the resource), that are not abstract and that cannot be performed as a set of mental acts by a human. For example, one or more performance characteristic of the computing infrastructure can be hidden and, therefore a bid value that would achieve a preemptiveless status cannot be determined as a set of mental acts. In another example, since the one or more performance characteristic of the computing infrastructure can be hidden, determining a bid value to achieve a defined target utilization rate and/or a defined quality of service level cannot be determined as a set of mental acts. In addition, since the performance characteristics can be hidden, a status of other entities bidding on resources, the job size of the other entities, the bidding value of the other entities, and so on, are not known and, therefore, a bid value that would provide an increase in a processing speed of usage of the resource by the entity cannot be determined as a set of mental acts. Further, some of the processes performed can be performed by specialized computers for carrying out defined tasks related to the bid advising/resource allocation area. For example, a bid advisor engine can generate performance models to predict usage of resources of a computing infrastructure while hiding performance characteristics of the computing infrastructure from the bidding entities. Based on the generated performance models, the bid advisor engine can provide a suggested bid value to achieve a defined parameter (e.g., quality of service, budget constraint) while mitigating preemption of the resource by other entities. The system 100 and/or components of the system can be employed to solve new problems that arise through advancements in technology, computer networks, the Internet and the like. The system 100 can provide technical improvements to resource allocation by improving processing efficiency among processing components in a resource allocation system by providing a bid value that mitigates waiting in a queue before a job can be executed and/or mitigates the chances of the job being preempted by another job, reducing delay in processing performed by processing components in a resource allocation system, avoiding or reducing the likelihood of network bottlenecks between processing components in a resource allocation system by distributing a job among resources, and/or improving bandwidth utilization for a network of processing components in a resource allocation system, etc. According to some implementations, the resource allocation system can be a resource allocation system.

Figure 3:
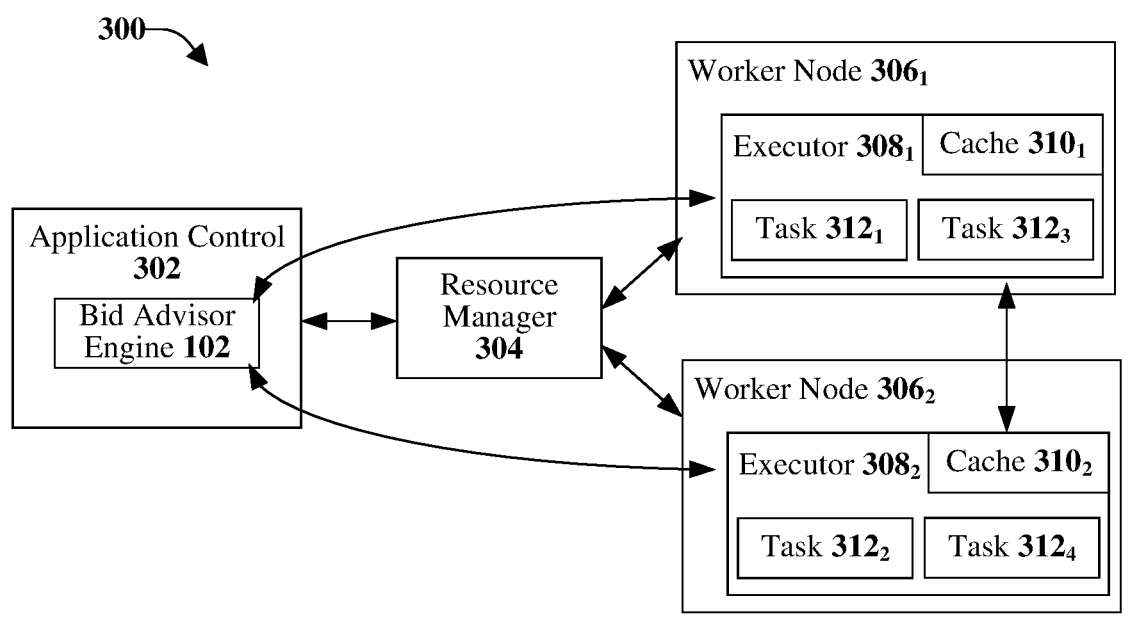
FIG. 3 illustrates an example, non-limiting representation of a cluster computing framework in accordance with one or more embodiments described herein.

FIG. 3 illustrates an example, non-limiting representation of a cluster computing framework 300 in accordance with one or more embodiments described herein. Repetitive description of like elements employed in other embodiments described herein is omitted for sake of brevity. As illustrated, an application control 302 can include the bid advisor engine 102. In some implementations, the bid advisor engine 102 can be a software platform that provides bid recommendation capabilities. In other implementations, the bid advisor engine 102 can be included within a software framework of a software platform. The software framework, in some implementations can be an open source platform where service entities submit applications, which can be data analytics types of applications. The application can be executed in a short amount of time or can take a longer amount of time (e.g., hours, days) depending of the particular type of data analytic job. These jobs or applications need a worker or a set of workers in order to be executed (e.g., ran). These workers can be virtual machines or containers that use resources from the computing infrastructure, or cloud infrastructure. The number of workers depends on the size of the application. These workers, because they utilize some resources from the cloud infrastructure, would be obtained by the entity when the entity submits a bid for the workers (e.g., in the non-on demand market). The question the entity needs to determine can be how much to bid for the needed workers in order to obtain the desired performance.

The application control 302 can utilize at least one resource manager 304 to coordinate a cluster. In this example, the cluster can include a first worker node $306_1$ and a second worker node $306_2$. Worker nodes, including first worker node $306_1$ and second worker node $306_2$, can be any nodes that can run application code in the cluster.

As illustrated, first worker node $306_1$ and second worker node $306_2$, can include a respective executor $308_1$, $308_2$, a respective cache $310_1$, $310_2$, and respective tasks $312_1$-$312_4$. The executor $308_1$, $308_2$ can be a process launched for an application that runs tasks (e.g., tasks $312_1$-$312_4$) and stores data (e.g., in cache $310_1$, $310_2$). The tasks $312_1$-$312_4$ can be units of work that can be sent to an executor $308_1$, $308_2$.

The application control 302 can manage applications such as jobs, stages, tasks, and so on. The application control 302 can also request resources, schedule tasks, and/or monitor executors and/or tasks. The at least one resource manager 304 can manage workers (e.g., worker nodes). The at least one resource manager 304 can also perform resource allocation. Further, the at least one resource manager 304 can serve multiple applications. The worker nodes can execute tasks, report status, and perform other functions.

Figure 4A:
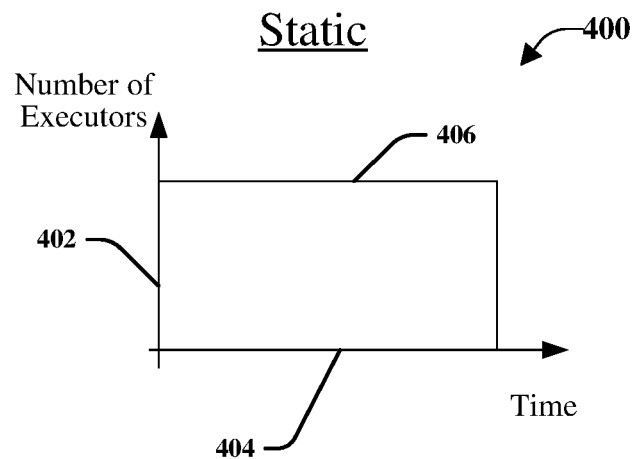
FIG. 4A illustrates a chart of example, non-limiting cluster size for a static allocation of executors in accordance with one or more embodiments described herein.

FIG. 4A illustrates a chart 400 of example, non-limiting cluster size for a static allocation of executors in accordance with one or more embodiments described herein. The vertical axis represents the number of executors 402; the horizontal axis represents time 404. As illustrated, for static allocation, the number of executors remains constant during the application lifetime as denoted by line 406. For static allocation of executors, resources (e.g., memory, CPU, and so on) within the software service framework can be reserved in advance and the number of executors can be determined based on parameters known at the time. By reserving the resources, there is no consideration given to the amount of resources that could be needed in the future and is limited to a constant number of executors. Accordingly, if more resources are needed than what has been allocated, a delay can be experienced.

Figure 4B:
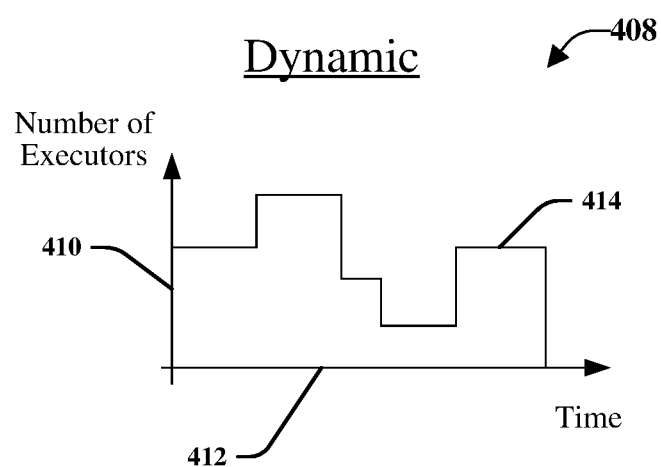
FIG. 4B illustrates a chart of example, non-limiting cluster sizes for a dynamic allocation of executors in accordance with one or more embodiments described herein.

FIG. 4B illustrates a chart 408 of example, non-limiting cluster size for a dynamic allocation of executors in accordance with one or more embodiments described herein. The vertical axis represents the number of executors 410; the horizontal axis represents time 412. In this case, the number of executors varies depending on the workload. This is illustrated by line 414 that depicts the changes to the number of executors over time. The dynamic embodiment can have an elastic scaling capability and, thus, can grow and/or shrink as needed. For example, if more executors are needed for pending tasks, more can be added based upon a request. In a similar manner, if one or more executors are idle, those executors can be removed.

The number of executors can be policy driven (e.g., request policy, remove policy). For example, a scale-up policy can request new executors when there are pending tasks. The number of additional executors can be increased linearly or exponentially, depending on one or more configuration parameters. In another example, a scale down policy can be configured to remove executors that have been idle for a defined amount of time (e.g., seconds, minutes, and so on).

Figure 5:
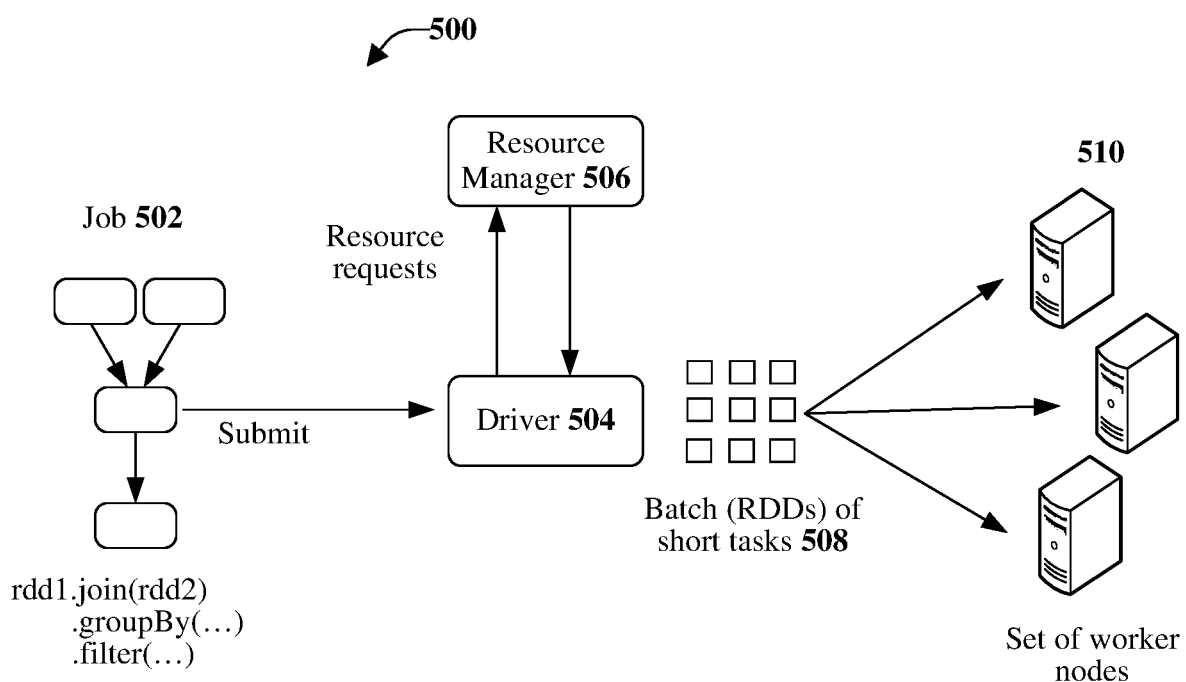
FIG. 5 illustrates an example, non-limiting representation of a data abstraction in accordance with one or more embodiments described herein.

FIG. 5 illustrates an example, non-limiting representation of a data abstraction in accordance with one or more embodiments described herein. Illustrated is a job 502 that can be submitted to a driver component 504. The driver component 504 can submit resource requests to a resource manager component 506 that determines the job to execute, as well as when to execute the job. Batches of short tasks 508 can be submitted to a set of worker nodes 510. The batches of short tasks 508 can be resilient distributed datasets (or RDDs). The resilient distributed datasets can be a collection of data partitions distributed across multiple machines (e.g., the set of worker nodes 510). Further, the resilient distributed datasets provide a rich set of coarse-grained transformations.

Figure 6:
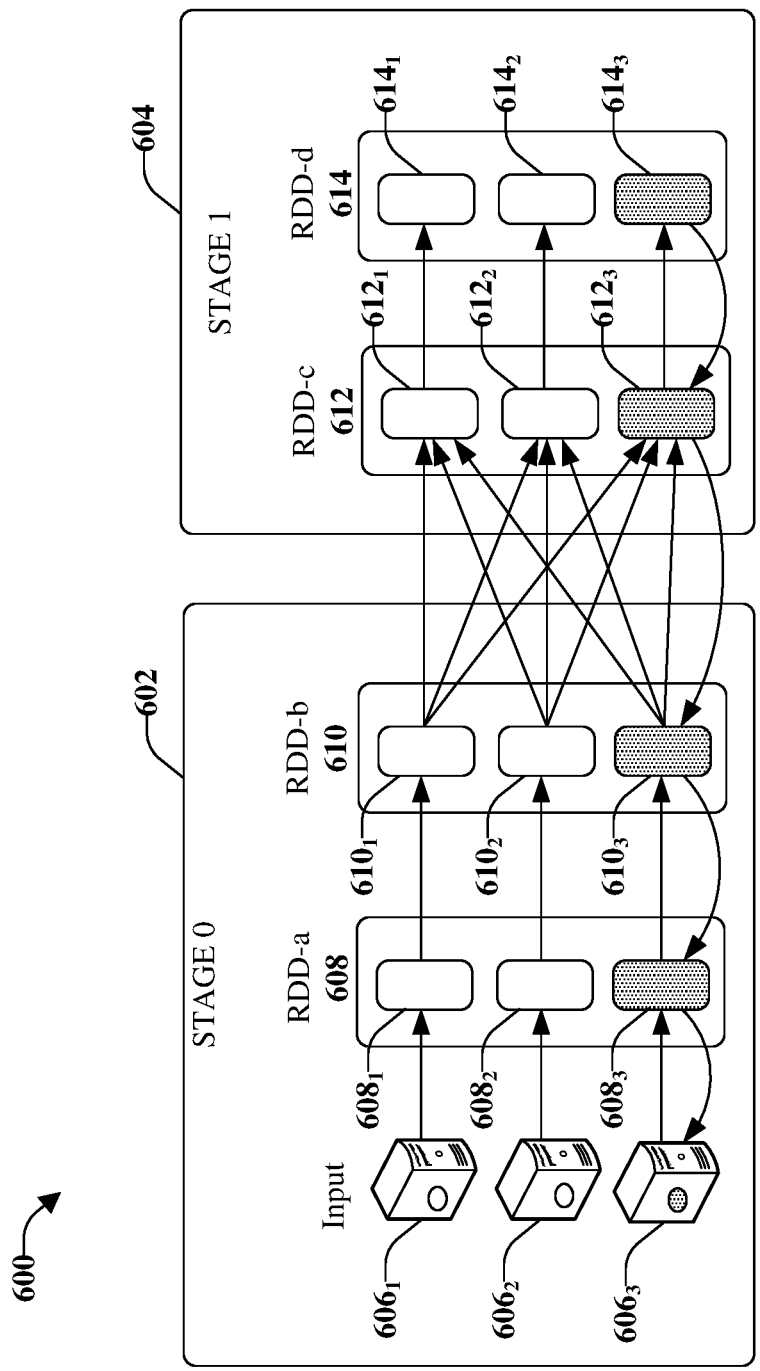
FIG. 6 illustrates an example, non-limiting representation of directed acyclic graph job scheduling in accordance with one or more embodiments described herein.

FIG. 6 illustrates an example, non-limiting representation of directed acyclic graph job scheduling in accordance with one or more embodiments described herein. The directed acyclic graph job scheduling is represented as an example lineage graph 600 that includes a sequence of transformations to compute a respective resilient distributed dataset. Jobs can be divided into stages. Illustrated are two stages, namely, a first stage 602 (Stage 0) and a second stage 604 (Stage 1).

Illustrated are three inputs, namely a first input $606_1$, a second input $606_2$, and a third input $606_3$, that transmit data to respective partitions included in RDD-a 608, which includes partitions, namely, a first RDD-a partition $608_1$, a second RDD-a partition $608_2$, and a third RDD-a partition $608_3$. The first RDD-a partition $608_1$, the second RDD-a partition $608_2$, and the third RDD-a partition $608_3$ of RDD-a 608 can be used by at most one partition on the subordinate RDD, labeled as RDD-b 610, which includes partitions, namely a first RDD-b partition $610_1$, a second RDD-b partition $610_2$, and a third RDD-b partition $610_3$. Next, a wide shuffle can be used where multiple subordinate partitions depend on one parent partition. This is illustrated by the links between the first RDD-b partition $610_1$, the second RDD-b partition $610_2$, and the third RDD-b partition $610_3$ and the partitions of RDD-c 612, labeled as a first RDD-c partition $612_1$, a second RDD-c partition $612_2$, and a third RDD-c partition $612_3$. Data from all parent partitions should be available and able to be shuffled across the nodes. Additionally, in this example, a narrow shuffle can be used between the first RDD-c partition $612_1$, the second RDD-c partition $612_2$, and the third RDD-c partition $612_3$, and the first RDD-d partition $614_1$, the second RDD-d partition $614_2$, and the third RDD-d partition $614_3$.

For narrow shuffle (e.g., from the first RDD-a partition $608_1$, the second RDD-a partition $608_2$, and the third RDD-a partition $608_3$ to the first RDD-b partition $610_1$, the second RDD-b partition $610_2$, and the third RDD-b partition $610_3$, respectfully) efficient failure recovery can be realized since only lost parent partitions (e.g., from the first RDD-a partition $608_1$, the second RDD-a partition $608_2$, and the third RDD-a partition $608_3$) need to be recomputed. However, for wide shuffle (e.g., from the first RDD-b partition $610_1$, the second RDD-b partition $610_2$, and the third RDD-b partition $610_3$ to the first RDD-c partition $612_1$, the second RDD-c partition $612_2$, and the third RDD-c partition $612_3$) if a partition is lost from all the ancestors, then a complete recomputation could be performed.

In the example lineage graph 600, in memory partitions are illustrated without shading (e.g., the first RDD-a partition $608_1$, the first RDD-b partition $610_1$, the first RDD-c partition $612_1$, the first RDD-d partition $614_1$, and the second RDD-a partition $608_2$, the second RDD-b partition $610_2$, the second RDD-c partition $612_2$, and the second RDD-d partition $614_2$) are partitions that are in-memory. Partitions that are lost are shaded (e.g., the third RDD-a partition $608_3$, the third RDD-b partition $610_3$, the third RDD-c partition $612_3$, and the third RDD-d partition $614_3$). In this example, there are no partitions that are checkpointed partition. As illustrated, for the lost partitions, a check back can be performed from a lost partition back to a parent partition.

Figure 7:
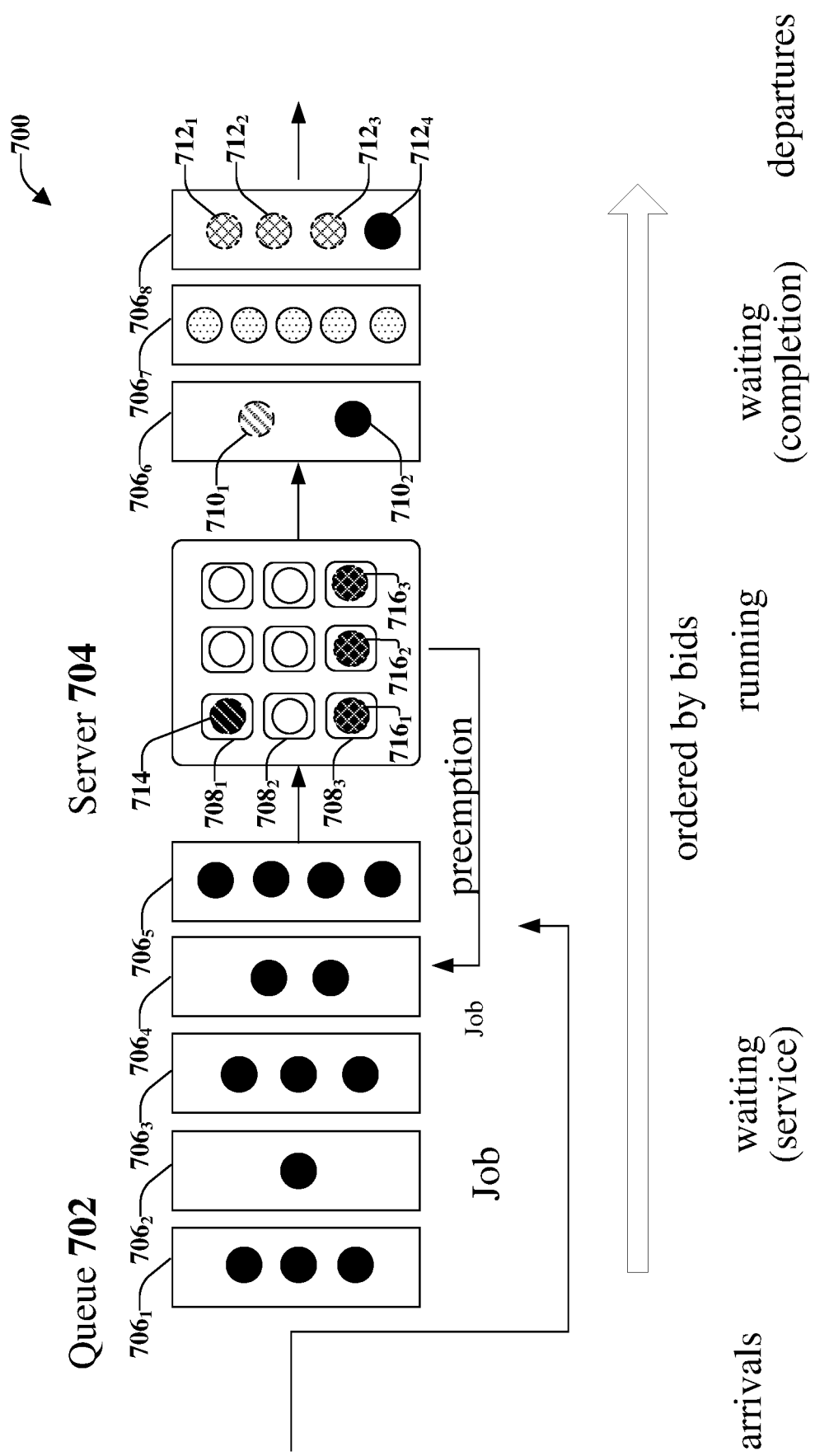
FIG. 7 illustrates an example, non-limiting multi-worker bidding queue in accordance with one or more embodiments described herein.

FIG. 7 illustrates an example, non-limiting multi-worker bidding queue 700 in accordance with one or more embodiments described herein. Requests move through the queue from the left to the right. If a first request is preempted by a second request, the first request can move to the left and back into the queue and, thus, the second request can move through the queue faster than the first request. The second request can be preempted by a subsequent request.

With continuing reference to FIG. 7, illustrated are a queue portion 702 and a server portion 704. Included in queue portion can be a number of requests, labeled as requests $706_1$, $706_2$, $706_3$, $706_4$, and $706_5$. Server portion 704 also includes requests, labeled as requests $706_6$, $706_7$, and $706_8$. Respective requests utilize one or more workers, represented as the circles inside the respective request. For example, request $706_1$ uses three workers, request $706_2$ uses one worker, request $706_3$ uses three workers, request $706_4$ uses two workers, and request $706_5$ uses four workers. Further, request $706_6$ uses two workers, request $706_7$ uses five workers, and request $706_8$ uses four workers.

The server portion 704 includes a number of slots for workers. For example, slots for workers are illustrated by the rectangles, three of which are labeled as slots $708_1$, $708_2$, and $708_3$ (the other slots are not labeled for purposes of simplicity). The requests in the server portion 704 can be waiting for completions. For request $706_6$, a first worker $710_1$ can be still running, while a second worker $710_2$ has completed. For request $706_7$, all five workers (not labeled) can be still running. Further, for request $706_8$, three workers, labeled as workers $712_1$, $712_2$, and $712_3$ can be still running, while a fourth workers $712_4$ has completed.

As illustrated, the corresponding workers can be residing in the server. For example, first worker $710_1$ for request $706_6$ is illustrated running within the server at 714. Workers $710_1$, $710_2$, and $710_3$ for request $706_8$ are illustrated running within the server at $716_1$, $716_2$, and $716_3$. The other five workers (not labeled) residing in the server are running request $706_7$ In operation, the order of bids proceeds from left to right in FIG. 7. Thus, incoming bids arrive on the left hand side and wait for service within the queue portion 702. Requests $706_1$, $706_2$, $706_3$, $706_4$, and $706_5$ are waiting for service while requests $706_6$, $706_7$, and $706_8$ are running and waiting for completion. Upon completion, the requests are illustrated as being removed from the right side of FIG. 7. Any arriving request can preempt requests already in the server queue. Thus, even though requests $706_6$, $706_7$, and $706_8$ are currently running, a new request that arrives and has a higher priority (usually a higher bid amount) preempts one or more requests in the server queue. Once preempted, the one or more requests return to waiting in the queue portion 702.

Figure 8A:
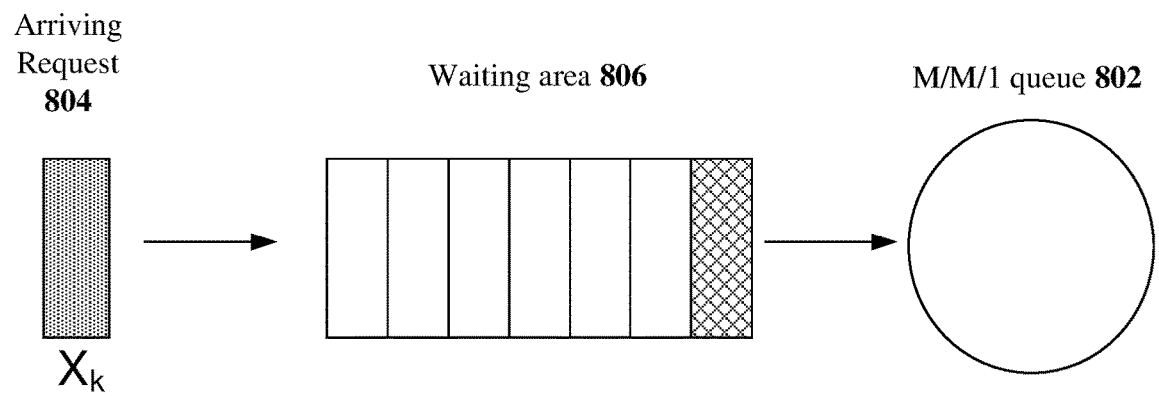
FIG. 8A illustrates a queuing model that represents a bribing game in accordance with one or more embodiments described herein.

FIG. 8A illustrates a queuing model that represents a bribing game in accordance with one or more embodiments described herein. In the queuing model, an M/M/1 queue 802 represents a queue length in a system that comprises a single server. As illustrated, a request 804 arrives for service and enters a queue or waiting area 806 that can include multiple requests.

Rules of the game can be as follows. Entities arrive as a Poisson process with mean rate of $\lambda$. Entities pay a fixed bribe to receive service from a server. An entity in service can be preempted by an entity that pays more. Preempted entities can join the queue again. Therefore, a challenge can be that entities do not know how many entities are ahead of him.

Figure 8B:
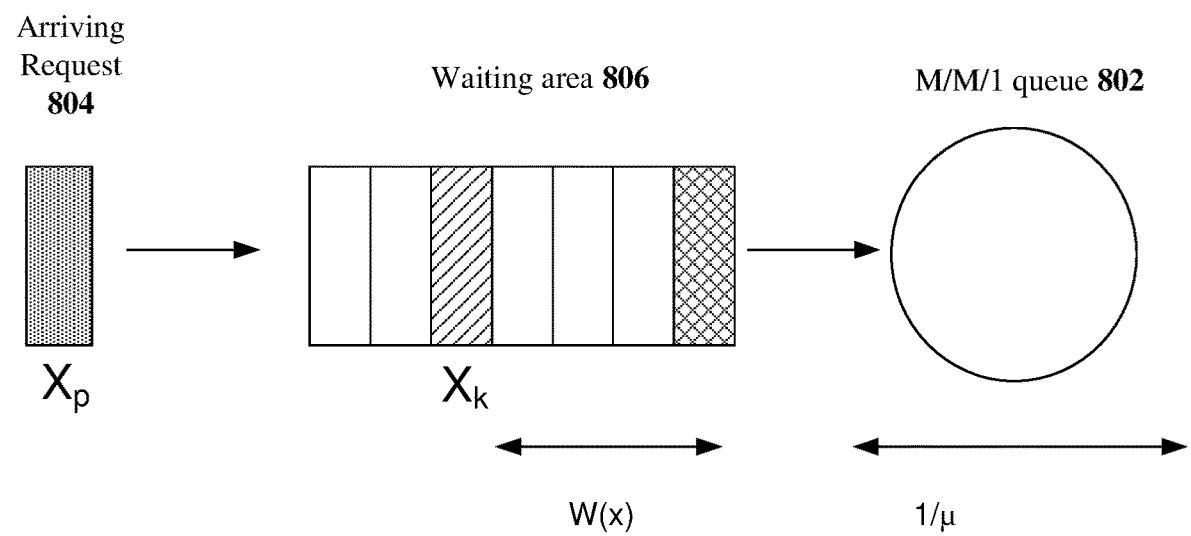
FIG. 8B illustrates another implementation of the queuing model that represents the bribing game in accordance with one or more embodiments described herein.

FIG. 8B illustrates another implementation of the queuing model that represents the bribing game in accordance with one or more embodiments described herein. An entity that pays a bribe x given a system load $\rho$ has to wait for various entities. For example, the entity has to wait for other entities already in the system with higher bribes than his bribe. The entity also has to wait for incoming entities (e.g., entities that arrive after him) whose bribes exceed his bribe. Further, the entity has to wait for his expected service time $1/\mu$, which can be represented by the following equation:

$$T(x) = \frac{1/\mu}{[1-\rho(1-B(x))]^2}. \quad \text{Equation 1}$$

where B is the cumulative distribution function of the entity's bribes. Further, the job slowdown can be a function of a service level agreement (SLA) can be expressed as:

$$S(x) = \frac{1}{[1-\rho(1-B(x))]^2}. \quad \text{Equation 2}$$

For example purposes the following describes an implementation of bribing a single server queue. Consider a single server M/M/1 bribing queue model with arrival and service rate given by $\lambda$ and $\mu$, respectively. Denote the server utilization by $\rho=\lambda/\mu<1$. The average response time for a customer with bid value x is given by Equation 1 above.

Define the average slowdown $$S(x) = \frac{T(x)}{(1/\mu)}.$$

Thus resulting in Equation 2 above.

Let S be the random variable representing the average slowdown across all customers. The state space of S is given by $S=\lfloor 1, 1/(1-\rho)^2 \rfloor$, where the range is obtained by evaluating equation 1 at $B(x)=1$ and $B(x)=0$, respectively. The bid value which yields a given average slowdown of $s \in S$ is obtained by inverting Equation 2, as:

$$x(s) = B^{-1}\left(1 - \frac{1-1/\sqrt{s}}{\rho}\right). \quad \text{Equation 3}$$

Consider the following three cases for B(x).

|        | uniform | linearly increasing | linearly decreasing |
|--------|---------|---------------------|---------------------|
| b(x)   | 1       | 2x                  | 2(1 − x)            |
| B(x)   | x       | $x^2$               | $1 − (1 − x)^2$     |
| $V_1(x)$ | $x^2$ | $x^4$               | $x^2(2 − x)^2$      |

The job slowdown can be a measure of quality of service. Slowdown is a relative measure that indicates that when using the on-demand market, a particular performance can be experienced. For example, the quality of service desired can be to finish a job in five minutes. Thus, where S(x) is the slowdown if the entity pays x. Thus, if the entity pays x, the job can run in ten minutes (e.g., slowdown is 2). If the entity pays higher value of x, the slowdown is 7 minutes (e.g., the slowdown is 1.4 derived from 7 divided by 5), and so on. This relationship is an example of the queuing model, however, other queuing models can be utilized with the disclosed aspects. The usage of the queuing model in a market driven resource allocation can provide an expression (or other expressions) that relate a quality of service measure to a bid value x.

Figure 9:
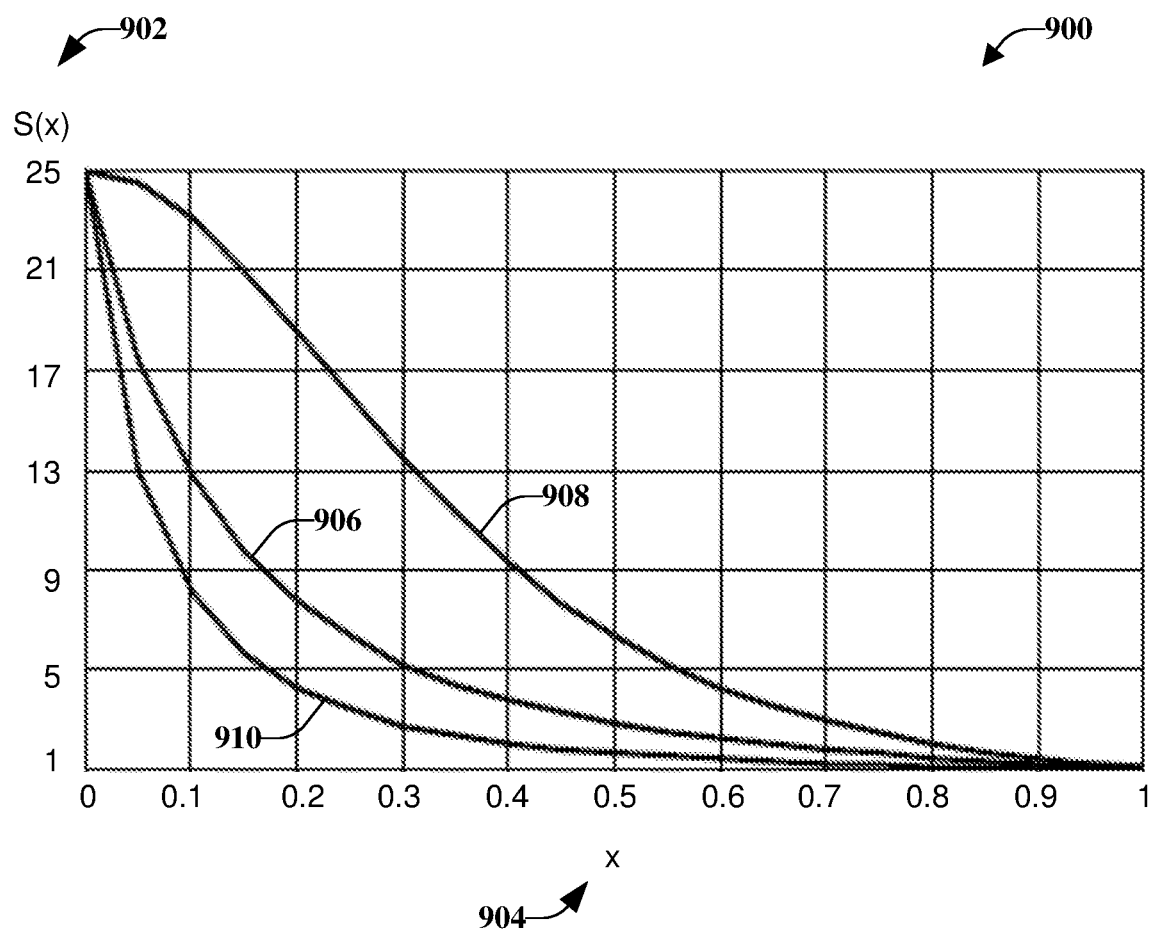
FIG. 9 illustrates an example, non-limiting graph representation for three example cases in accordance with one or more embodiments described herein.

FIG. 9 illustrates an example, non-limiting graph representation 900 of the above three example cases for B(x) in accordance with one or more embodiments described herein. In this example, the graph illustrates the effect of B(x) on S(x) at $\rho=0.8$. The vertical axis 902 represents S(x) and the horizontal axis 904 represents x. The uniform case is illustrated at line 906; the linearly increasing case is illustrated at line 908; and the linearly decreasing case is illustrated at line 910.

Design considerations include resource allocation based on entity bids. Further, an entity typically has a certain delay tolerance. In addition, workloads have elastic demands, taking as many resources as they can get.

Figure 10:
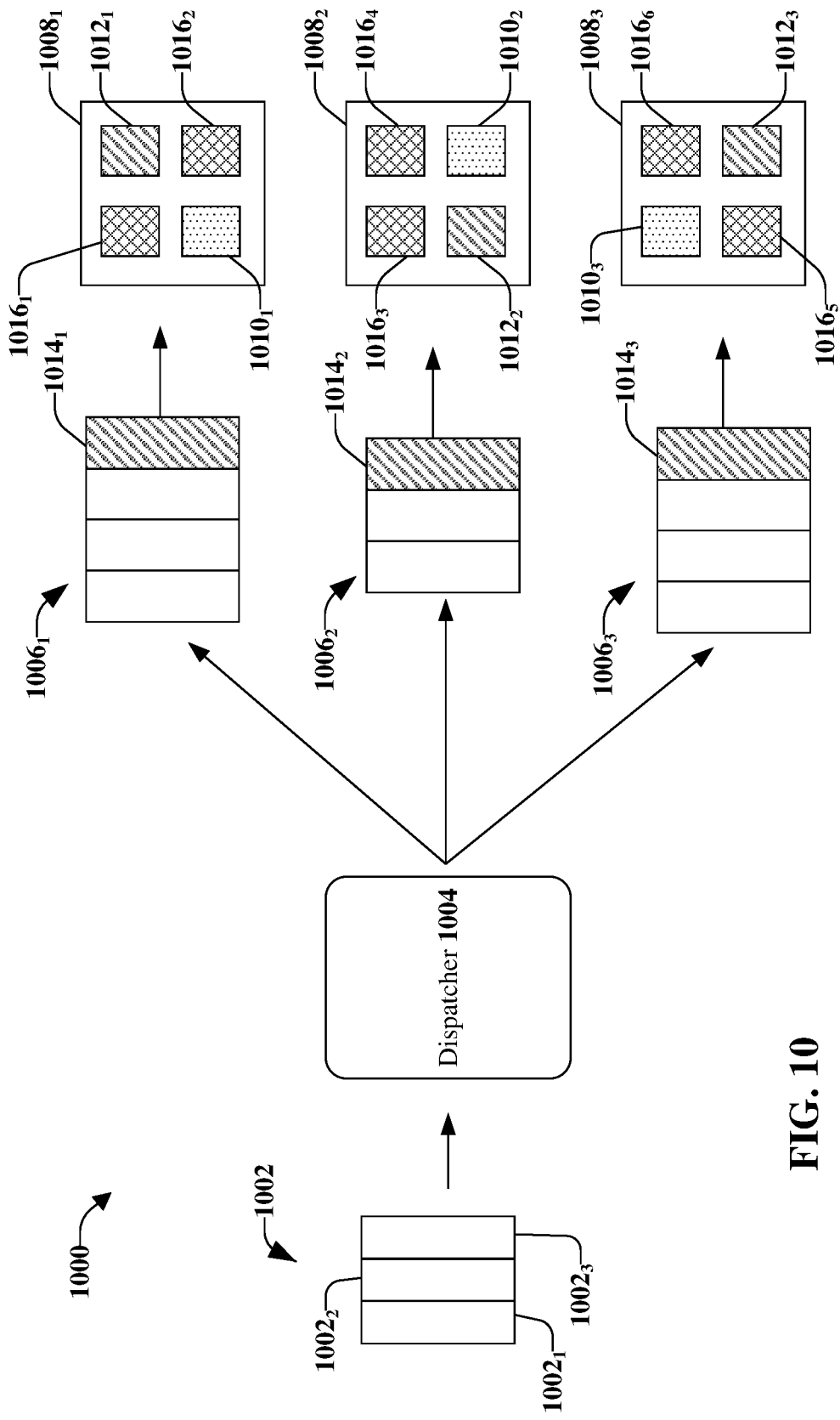
FIG. 10 illustrates an example, non-limiting implementation of a bid advisor that facilitates preemptive queuing in accordance with one or more embodiments described herein.

FIG. 10 illustrates an example, non-limiting implementation 1000 of a bid advisor that facilitates preemptive queuing in accordance with one or more embodiments described herein. In an example, the bid advisor can be configured to operate within a spot market. In this example implementation, a job 1002 to be run includes three workers $1002_1$, $1002_2$, and $1002_3$ to run the job 1002. Also illustrated are a dispatcher 1004, multiple bribe queues $1006_1$, $1006_2$, and $1006_3$ and cluster nodes $1008_1$, $1008_2$, and $1008_3$. The cluster nodes $1008_1$, $1008_2$, and $1008_3$ can be similar to servers in an infrastructure.

The dispatcher 1004 can dispatch the workers $1002_1$, $1002_2$, and $1002_3$ on the cluster nodes $1008_1$, $1008_2$, and $1008_3$. In an example, the dispatcher 1004 can perform round-robin container allocation across the multiple bribe queues $1006_1$, $1006_2$, and $1006_3$. In the example of FIG. 10, worker $1002_1$ can be dispatched by the dispatcher 1004 on first bribe queue $1006_1$; worker $1002_2$ on second bribe queue $1006_2$, and worker $1002_3$ on a third bribe queue $1006_3$. However, other implementations can be possible. For example, in some implementations, more than one worker can be dispatched on the respective bribe queue. In other implementations, one or more bribe queues might not be dispatched a worker for a particular job. For example, in an implementation where there are five bribe queues and five workers are needed, two workers can be dispatched to one bribe queue, one worker dispatched respectively to three bribe queues, and the fifth bribe queue does not have a worker dispatched to that bribe queue.

The dispatcher 1004 dispatches the workers $1002_1$, $1002_2$, and $1002_3$ such that the workers $1002_1$, $1002_2$, and $1002_3$ experience on average similar slowdowns. Additionally, if some workers $1002_1$, $1002_2$, and $1002_3$ are lost, the job 1002 still makes progress. For example, if worker $1002_2$ on bribe queue $1004_2$, is preempted by an incoming job that pays a higher bribe, worker $1002_1$ on bribe queue $1004_1$ and worker $1002_3$ on bribe queue $1004_3$ can continue to execute the job.

As illustrated, there can be one independent bribe queue $1006_1$, $1006_2$, and $1006_3$ per cluster nodes $1008_1$, $1008_2$, and $1008_3$. For example, bribe queue $1006_1$ can be associated with a cluster node $1008_1$; bribe queue $1006_2$ can be associated second cluster node $1008_2$; and bribe queue $1006_3$ can be associated with cluster node $1008_3$. Although illustrated and described as three bribe queues and corresponding cluster nodes, fewer or more than three bribe queues and three cluster nodes can be utilized in various implementations.

On respective servers or cluster nodes $1008_1$, $1008_2$, and $1008_3$ are workers, represented as squares within respective cluster nodes $1008_1$, $1008_2$, and $1008_3$. In the illustrated example, the cluster nodes comprise four workers. The square representations (e.g., workers) execute a particular application and workers across cluster nodes can be utilized to execute the application. For example, worker 10101 in cluster node $1008_1$, worker 10102 in cluster node $1008_2$, and worker $1010_3$ in cluster node $1008_3$ represent the workers to run the job 1002. Further, worker $1012_1$ in cluster node $1008_1$, worker $1012_2$ in cluster node $1008_2$, and worker $1012_3$ in cluster node $1008_3$ represent the workers to run job 1014 within the queues. Additionally, workers $1016_1$ and $1016_2$ in cluster node $1008_1$, workers $1016_3$ and $1016_4$ in cluster node $1008_2$, and workers $1016_5$ and $1016_6$ in cluster node $1008_3$ represent the workers to run another job (not illustrated). It is noted that although the example comprises four workers per cluster node, more or fewer workers can be available for respective cluster nodes.

The bribe queues $1006_1$, $1006_2$, and $1006_3$ can implement the bribing queue as discussed herein. To implement the bribing queue, the bribe queues $1006_1$, $1006_2$, and $1006_3$ can differentiate among entities such that the entity that bids higher receives better performance by jumping ahead of other entities in the queue. Further, the bribe queues $1006_1$, $1006_2$, and $1006_3$ can differentiate the entity that bids higher so that the entity can be preemptiveless (e.g., not able to be preempted) or nearly preemptiveless (e.g., it can be difficult to preempt the entity) once a particular node runs on a server (e.g., the cluster nodes $1008_1$, $1008_2$, and $1008_3$). A source of prediction error can include use of a multi-server queue instead of an M/M/1 queue. Another source of prediction error can be a uniform bidding entity assumption. Thus, in these cases, other jobs can preempt the entity.

Figure 11:
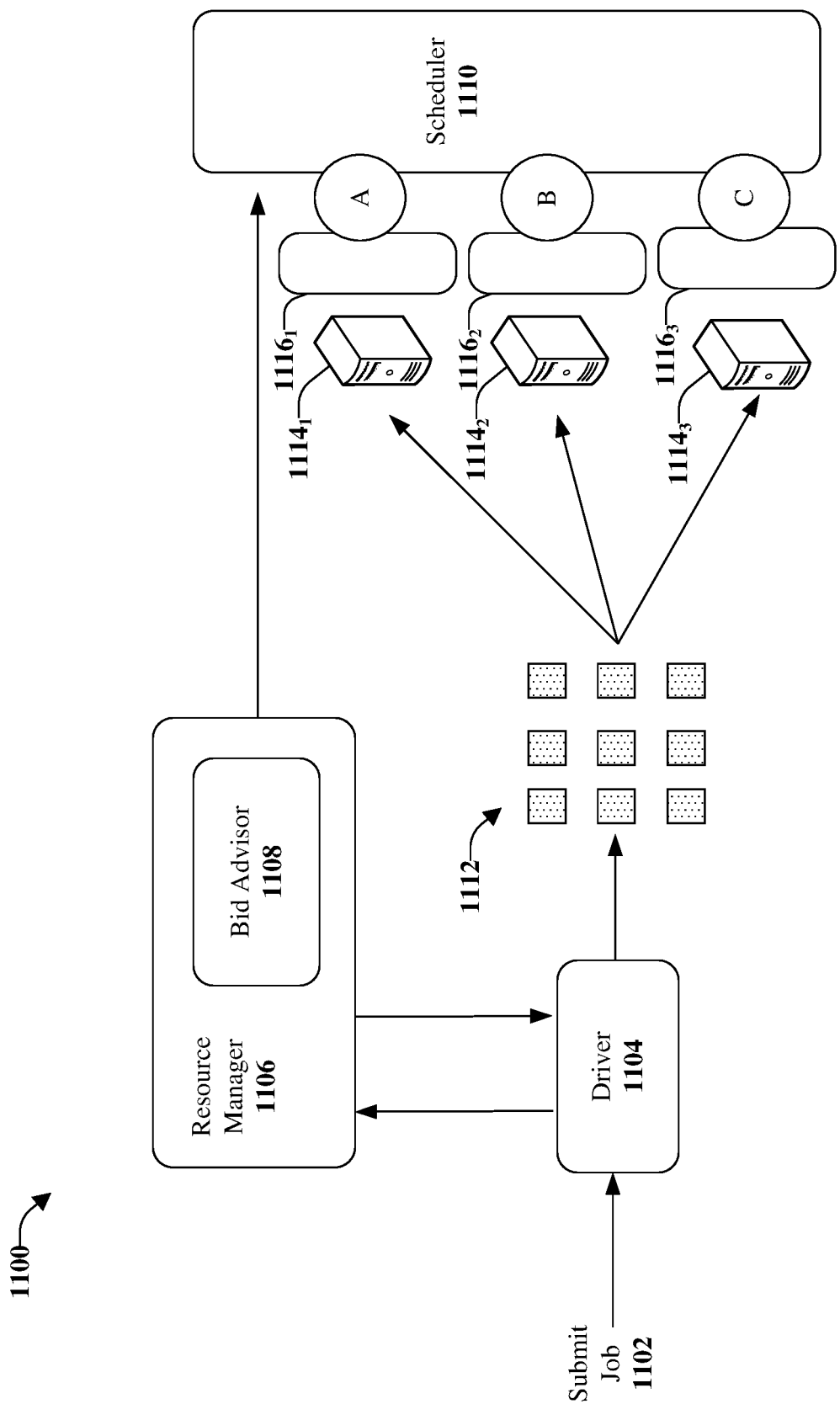
FIG. 11 illustrates a schematic representation of a system that implements bid advising in resource allocation data analytics frameworks in accordance with one or more embodiments described herein.

FIG. 11 illustrates a schematic representation of a system 1100 that implements bid advising in resource allocation data analytics frameworks in accordance with one or more embodiments described herein. A job can be submitted at 1102 to a driver 1104 that submits resource requests to a resource manager 1106 that can include a bid advisor 1108. The bid advisor 1108 can create and/or delete containers maintained by a scheduler 1110. The scheduler 1110 can take into account individual (e.g., per job) and collective (e.g., across two or more jobs) resource requirements, quality of service requirements, policy constraints, and other requirements in order to perform scheduling of the various jobs.

In an implementation, the driver 1104 can submit the job 1102 and can create batches (RDDs) of short tasks 1112. The short tasks 1112 can be distributed to one or more servers for implementation. For example, a first set of the short tasks 1112 can be submitted to a first server $1114_1$, a second set of the short tasks 1112 can be submitted to a second server $1114_2$, and a third set of the short tasks 1112 can be submitted to a third server $1114_3$ and/or additional servers (not shown).

The first server $1114_1$ can be associated with a first node agent $1116_1$, the second server $1114_2$ can be associated with a second node agent $1116_2$, and the third server $1114_3$ can be associated with a third node agent $1116_3$. The first node agent $1116_1$, the second node agent $1116_2$, and the third node agent $1116_3$ can interface with the scheduler 1110 and can be responsible for what is running on its respective server. According to an implementation, container placement can be via node labels.

Figure 12:
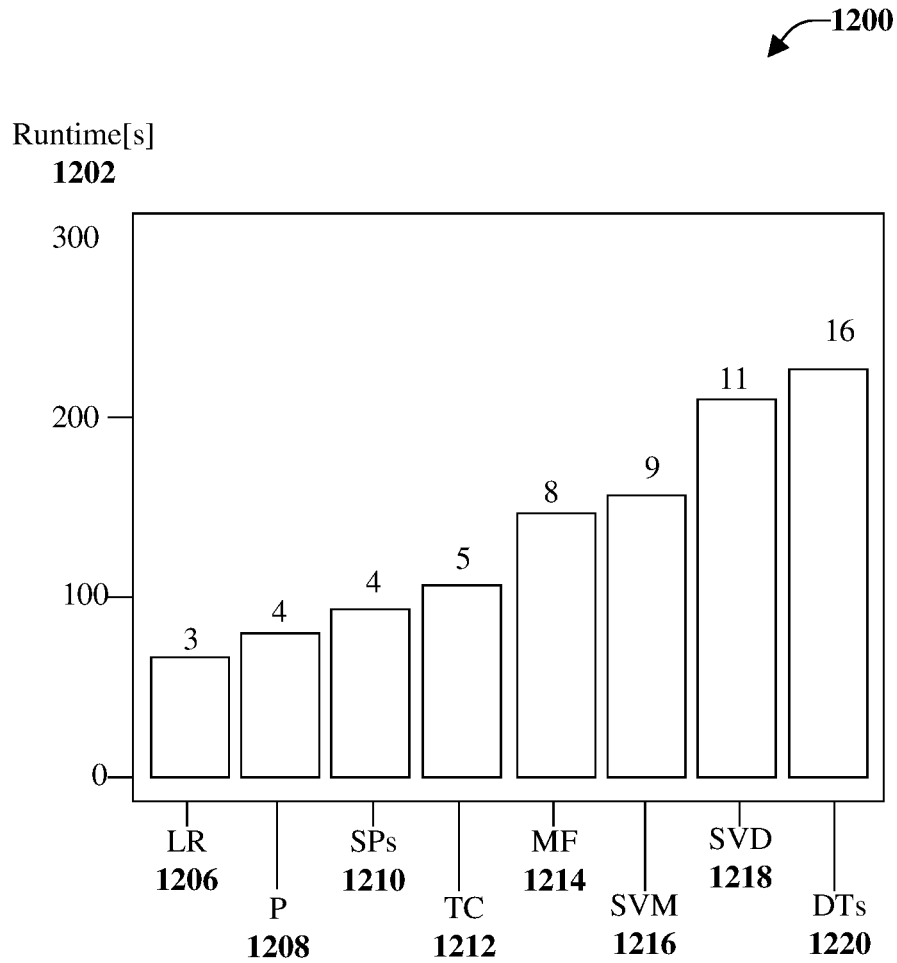
FIG. 12 illustrates an example, non-limiting chart of a benchmark for an experimental setup in accordance with one or more embodiments described herein.

FIG. 12 illustrates an example, non-limiting chart 1200 of a benchmark for an experimental setup in accordance with one or more embodiments described herein. Runtimes 1202 are illustrated on the vertical axis; applications 1204 are illustrated on the horizontal axis. For the experimental setup, a ten virtual machine cluster with eight cores and eight gigabyte per virtual machine was used. Further, the bribe queue (e.g., the bribe queue component) can include ten bribe queues, wherein respective bribe queues of the ten bribe queues use six out of eight slots.

The various applications tested include linear regression (LR 1206), Pagernak (P 1208), ShortestPaths (SPs 1210), TriangleCount (TC 1212), MatrixFactorization (MF 1214), SVM (SVM 1216), SVDPlusPlus (SVD 1218), and DecisionTrees (DTs 1220). LR 1206 had the shorted runtime, while DTs 1220 had the longest runtime.

Figure 13:
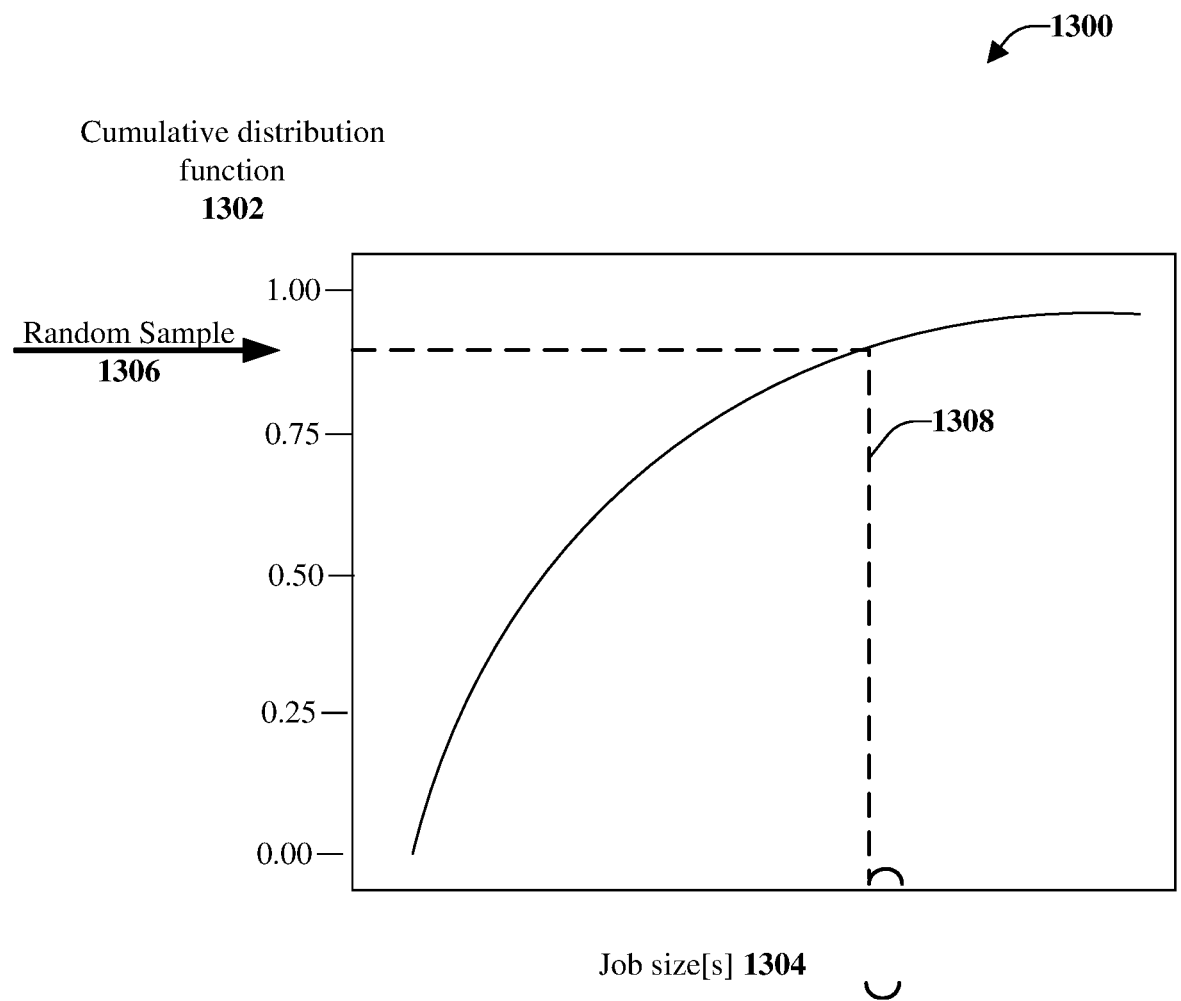
FIG. 13 illustrates an example chart of a workload generation in accordance with one or more embodiments described herein.

FIG. 13 illustrates an example chart of a workload generation in accordance with one or more embodiments described herein. A cumulative distribution function 1302 is illustrated along the vertical axis and job size 1304 is illustrated along the horizontal axis. It is noted that horizontal axis is in logscale. For this experiment, a total time of around one hour was sampled. The experiment generated a two hundred job workload. A random sample 1306 was drawn, as indicated by the dashed line 1308 within the graph 1300.

In this example, it was demonstrated that MapReduce workloads were heavy-tailed. MapReduce workloads or jobs split the input data-set into independent chunks that can be processed in a parallel, distributed manner. As illustrated, the results can be a Pareto shape of 1.25.

Figure 14:
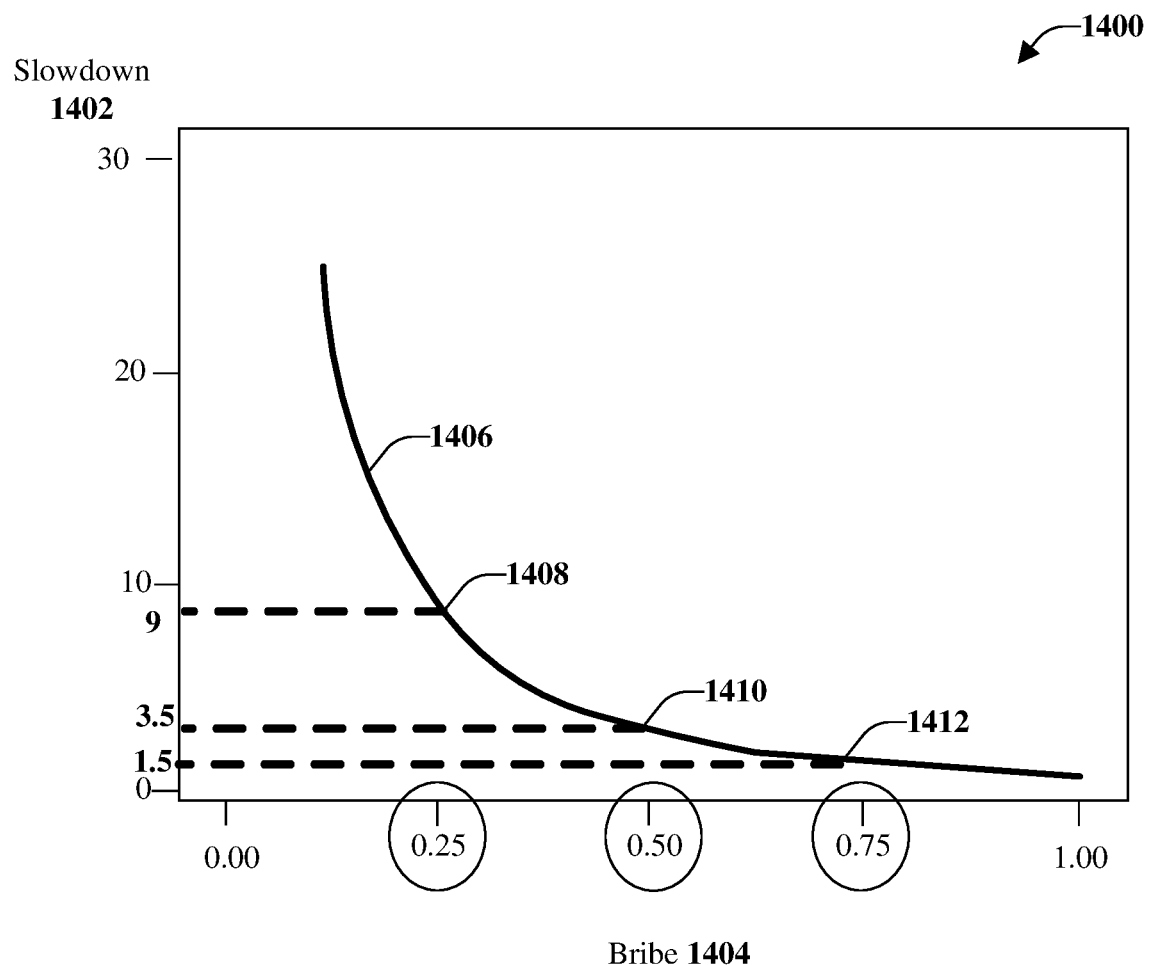
FIG. 14 illustrates an example, non-limiting chart of classes of service in accordance with one or more embodiments described herein.

FIG. 14 illustrates an example, non-limiting chart 1400 of classes of service in accordance with one or more embodiments described herein. A slowdown rate 1402 is illustrated on the vertical axis; bribe amounts 1404 are illustrated on the horizontal axis. In this example, a provider sets a target utilization of 0.9. Further, a load of 0.9 was imposed using a Poisson arrival process.

The bribe amounts 1404 can be expressed as 0.00, 0.25, 0.50, 0.75, and 1.00. A bribe of 0.00 indicates that no enhanced bribe is provided (e.g., the entity pays the expected or standard rate). A bribe of 1.0 indicates that a total amount of an enhance bribe is paid (e.g., the entity pays 100% of a bribe value, which renders the entity's jobs as preemptiveless). A bribe value of 0.75 indicates a payment of seventy-five percent of the total bribe value; a bribe value of 0.50 indicates a payment of fifty percent of the total bribe value; and a bribe value of 0.25 indicates a payment of twenty-five percent of the total bribe value.

As illustrated by the curved line 1406, the higher the bribe amount that is paid results is a corresponding reduction in the slowdown rate. For example, when the 0.25 bribe amount is paid, the slowdown is 9, as illustrated at 1408 and when the 0.50 bribe amount is paid, the slowdown can be 3.5, as indicated at 1410. Continuing this example, when the 0.75 bribe amount is paid, the slowdown can be 1.5, as indicated at 1412.

The respective bribe amounts (e.g., 0.25, 0.50, and 0.75) can be associated with different service level agreements. The three bribe amounts illustrated can be designated because these bribe amounts (and associated service level agreements) fit uniformly within a defined price range, according to an example.

FIG. 15 illustrates an example, non-limiting schematic representation 1500 of a model validation of the results for the example use case in accordance with one or more embodiments described herein. As illustrated, based on request from entities 1502, a model 1504 can be generated and can performs simulations of one or more scenarios related to a system 1506 for resource allocation. In the entity space, an entity does not know how many other entities are bribing the server. Entities can assume uniform distribution and chose x to meet a target slowdown $y_t$.

$$S_U(x_k) = \frac{1}{[1 - \rho(1 - x_k)]^2} = 1 + \beta \frac{W(x_k)}{1/\mu}$$

$$x_k = S_u^{-1}(y_t)$$

where β is the adjustment factor.

In the provider space, the server can build up the bribe distribution B(x) over time. The server can estimate r based on m and u.

$$y_s = S_D(x_k) = 1 + \frac{W(x_k)}{1/\mu}$$

Figures 15A, 15B:
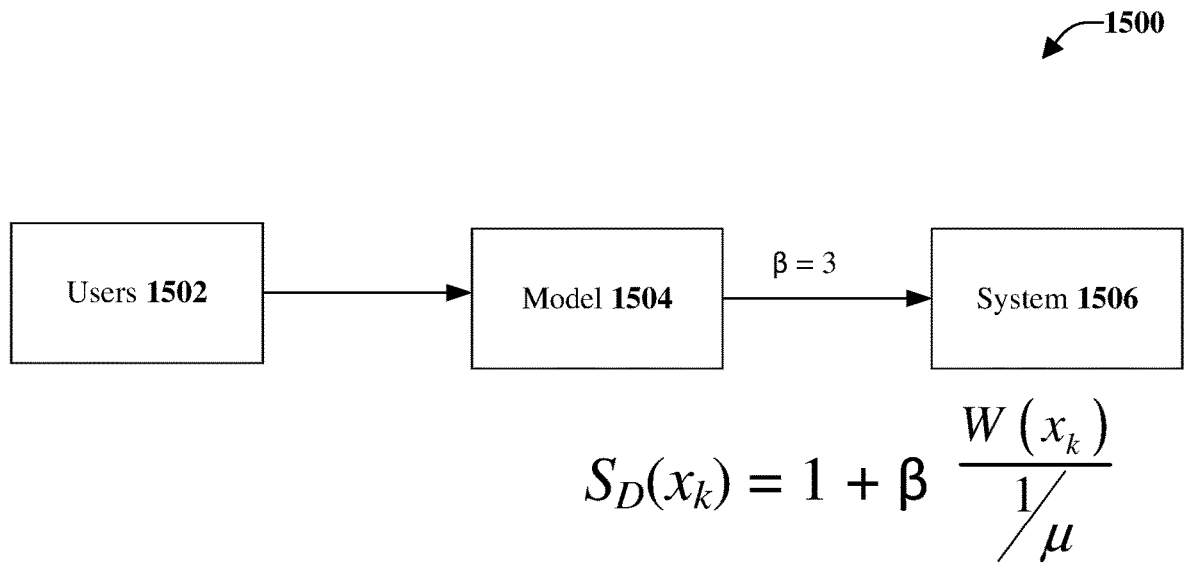
FIG. 15A illustrates an example, non-limiting schematic representation of a model validation of the results for the example use case in accordance with one or more embodiments described herein.
FIG. 15B illustrates an example, non-limiting chart for an experimental model of FIG. 15A in accordance with one or more embodiments described herein.

FIG. 15B illustrates an example, non-limiting chart 1508 for the experimental model of FIG. 15A in accordance with one or more embodiments described herein. As illustrated in the chart 1508, for the entities 1502 the value of B(x) is unknown, while the slowdown factor for gold is 1.5; for silver is 3.5; and for chrome is 9. For the model 1504, the value of B(x) is known and the slowdown factor for gold is 1.4, for silver is 3.3, and for chrome is 25. For the system 1506, the value of (B)x is learned and the slowdown factor for gold is 1.1, for silver is 1.57, and for chrome is 7. Further details for this model validation are provided below with respect to the following figures.

Figure 16:
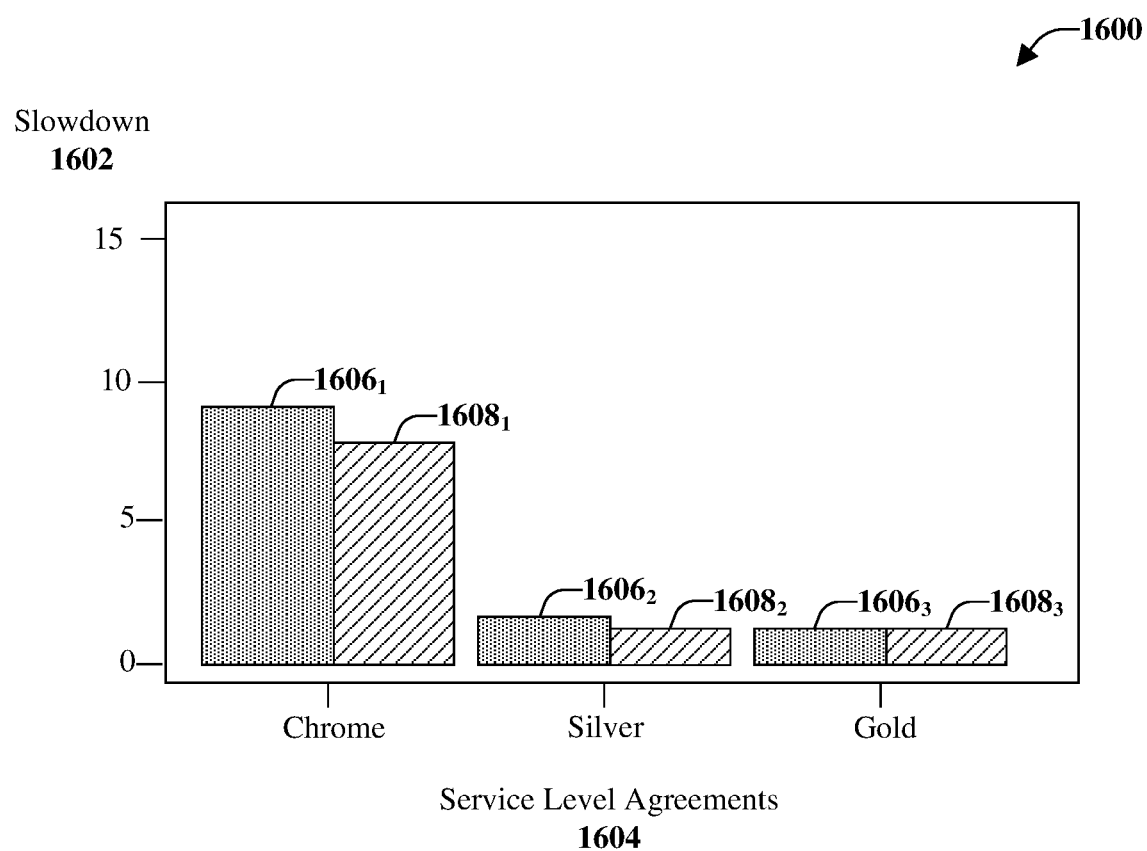
FIG. 16 illustrates an example, non-limiting chart for model validation in accordance with one or more embodiments described herein.

FIG. 16 illustrates an example, non-limiting chart 1600 for model validation in accordance with one or more embodiments described herein. A slowdown rate 1602 is illustrated on the vertical axis; service level agreements 1604 are illustrated on the horizontal axis. In this example, the service level agreements 1604 include three levels: chrome, silver, and gold. The chrome service level agreement can be the least expensive bribe amount with the longest slowdown. The gold service level agreement can be the most expensive bribe amount with the shortest slowdown. The silver service level agreement has a cost and service level agreement performance that can be between the respective costs and performance of the chrome service level agreement and gold service level agreement.

The respective service level agreements can be associated with a different bribe level or bribe value, which corresponds to a slowdown level. In this example, the slowdown level for the respective service level agreement can be broken down between two containers, namely a model 1606 and a system 1608. The model 1606 is a predicted result and the system is an actual result. For example, for the model 1606, the slowdown for the chrome service level agreement is illustrated at 1606$_1$; for the silver service level agreement the slowdown is illustrated at 1606$_2$, and for the gold service level agreement the slowdown is illustrated at 1606$_3$. In a similar manner, for the system 1608, the slowdown for the chrome service level agreement is illustrated at 1608$_1$; for the silver service level agreement the slowdown is illustrated at 1608$_2$, and for the gold service level agreement the slowdown is illustrated at 1608$_3$.

As illustrated by the differentiation based on the service level agreements, there can be about a twenty percent prediction error during the experimental setups. The better the service level agreement (e.g., silver, gold), the better the prediction error. The results indicated that the adjustment factor can be stable for different distributions of service level agreements.

Figure 17:
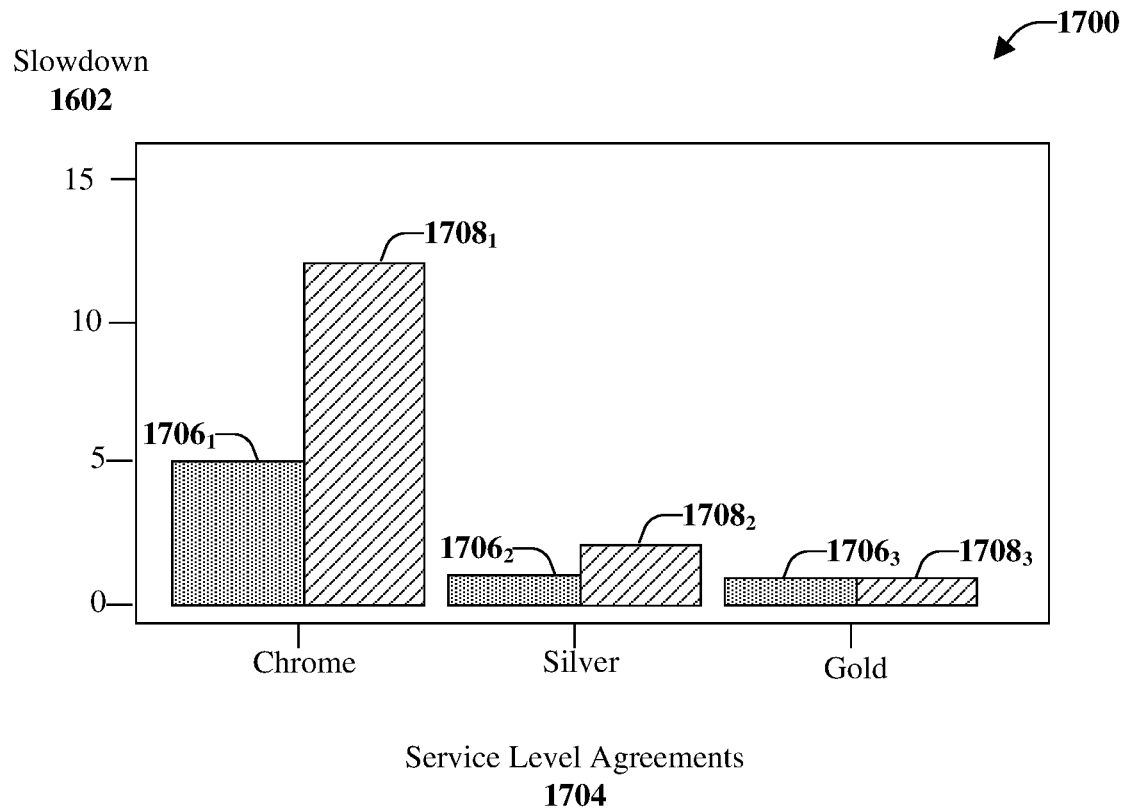
FIG. 17 illustrates an example, non-limiting chart for slowdown performance in accordance with one or more embodiments described herein.

FIG. 17 illustrates an example, non-limiting chart 1700 for slowdown performance in accordance with one or more embodiments described herein. A slowdown rate 1702 is illustrated on the vertical axis; service level agreements 1704 are illustrated on the horizontal axis. Similar to the above figure, the service level agreements 1704 can include three levels: chrome, silver, and gold. The chrome service level agreement is the least expensive bribe amount with the longest slowdown. The gold service level agreement can be the most expensive bribe amount with the shortest slowdown. The silver service level agreement has a cost and service level agreement performance that can be between the respective costs and performance of the chrome service level agreement and gold service level agreement.

The respective service level agreements can be associated with a different bribe level or bribe value, which corresponds to a slowdown level. In this example, the slowdown level for the respective service level agreement can be broken down between two containers, namely a median 1706 and a 95% 1708. For the median 1706, the slowdown for the chrome service level agreement is illustrated at 1706$_1$; for the silver service level agreement the slowdown is illustrated at 1706$_2$, and for the gold service level agreement the slowdown is illustrated at 1706$_3$. In a similar manner, for the 95% 1708, the slowdown for the chrome service level agreement is illustrated at 1708$_1$; for the silver service level agreement the slowdown is illustrated at 1708$_2$, and for the gold service level agreement the slowdown is illustrated at 1708$_3$.

As illustrated, the chrome service level agreement can be slower than the silver service level agreement, which can be slower than the gold service level agreement at all percentiles. Good performance was available at the median across all service levels (e.g., 1706$_1$; 1706$_2$, and 1706$_3$). There were unlucky jobs due to the high load of 0.9. However, in practice an entity can give up earlier.

Figure 18:
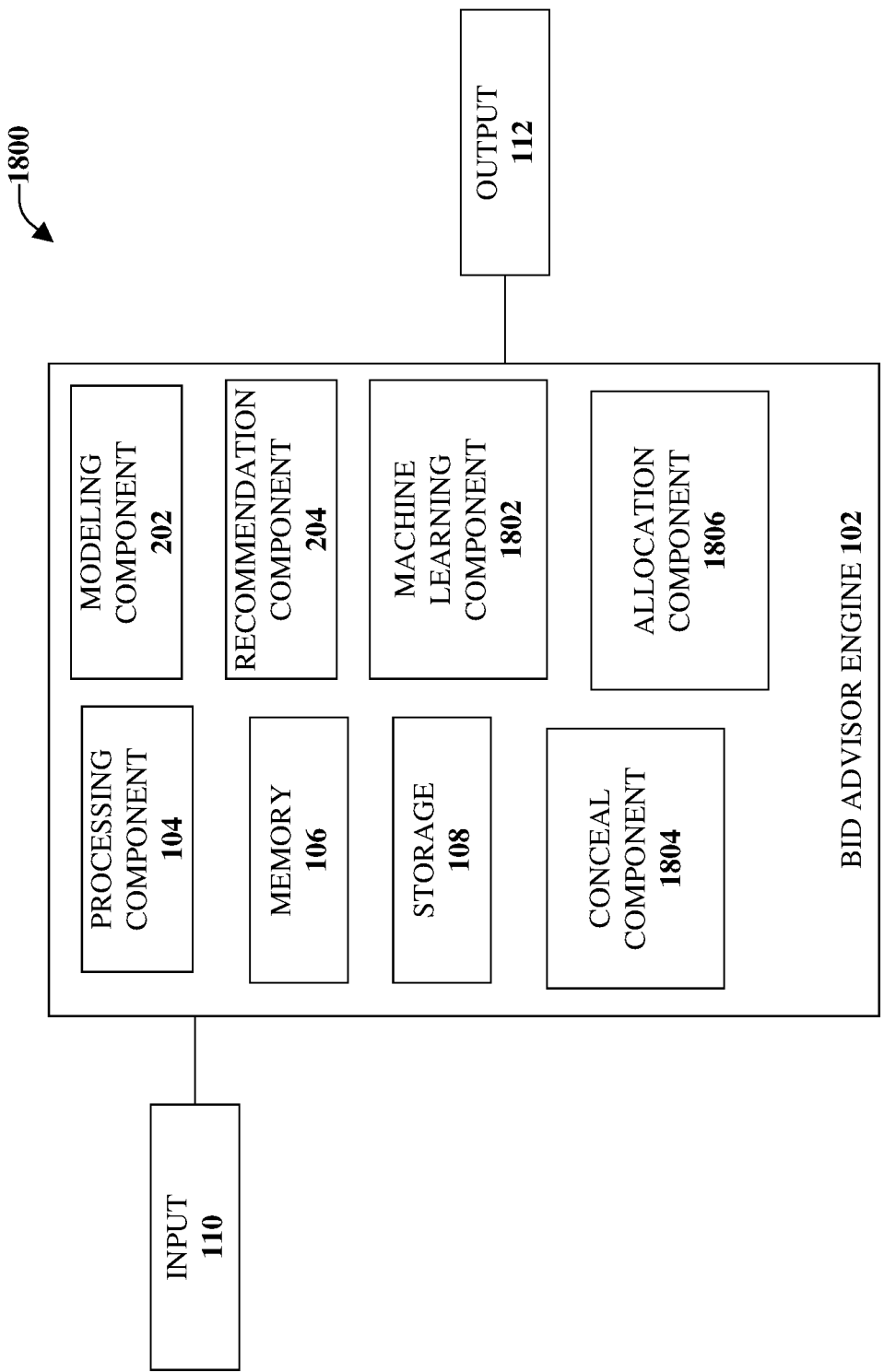
FIG. 18 illustrates a high-level block diagram of an example, non-limiting system that facilitates bid advising in accordance with one or more embodiments described herein.

FIG. 18 illustrates a high-level block diagram of an example, non-limiting system 1800 that facilitates bid advising in accordance with one or more embodiments described herein. Repetitive description of like elements employed in other embodiments described herein is omitted for sake of brevity. Non-limiting system 1800 can comprise one or more of the components and/or functionality of system 100 and/or system 200, and vice versa.

The system 100 and/or the components of the system 100 can be employed to use hardware and/or software to solve problems that are highly technical in nature (e.g., determine a bid value that conforms to a slowdown performance tolerance level based on a consideration of other entities attempting to access the resource and respective bid values attributed to the other entities; determine a bid value that conforms to a target utilization rate based on the amount of resources available and usage of one or more of the resources available by other entities; determine one or more bid values for access to a resource with an indication of a respective quality of service for the one or more bid values; determine one or more bid values for a resource to mitigate loss, at least temporarily, of the resource due to preemption by another entity; and determine a suggested bid value for the resource in order to increase a processing speed of usage of the resource), that are not abstract and that cannot be performed as a set of mental acts by a human. For example, one or more performance characteristic of the computing infrastructure can be hidden and, therefore a bid value that would achieve a preemptiveless status cannot be determined as a set of mental acts. In another example, since the one or more performance characteristic of the computing infrastructure can be hidden, determining a bid value to achieve a defined target utilization rate and/or a defined quality of service level cannot be determined as a set of mental acts. In addition, since the performance characteristics can be hidden, a status of other entities bidding on resources, the job size of the other entities, the bidding value of the other entities, and so on, are not known and, therefore, a bid value that would provide an increase in a processing speed of usage of the resource by the entity cannot be determined as a set of mental acts. Further, some of the processes performed can be performed by specialized computers for carrying out defined tasks related to the bid advising/resource allocation area. For example, a bid advisor engine can generate performance models to predict usage of resources of a computing infrastructure while hiding performance characteristics of the computing infrastructure from the bidding entities. Based on the generated performance models, the bid advisor engine can provide a suggested bid value to achieve a defined parameter (e.g., quality of service, budget constraint) while mitigating preemption of the resource by other entities. The system 100 and/or components of the system can be employed to solve new problems that arise through advancements in technology, computer networks, the Internet and the like. The system 100 can provide technical improvements to resource allocation by improving processing efficiency among processing components in a resource allocation system by providing a bid value that mitigates waiting in a queue before a job can be executed and/or mitigates the chances of the job being preempted by another job, reducing delay in processing performed by processing components in a resource allocation system, avoiding or reducing the likelihood of network bottlenecks between processing components in a resource allocation system by distributing a job among resources, and/or improving bandwidth utilization for a network of processing components in a resource allocation system, etc. According to some implementations, the resource allocation system can be a market-based resource allocation system.

In an embodiment, the system 1800 can include a machine learning component 1802. The machine learning component 1802 can perform a set of machine learning computations associated with the input 110 and/or the output 112. For example, the machine learning component 1802 can perform a set of model generations related to expected performance level of resources of a computing infrastructure associated with a provider network that comprises one or more resources available for allocation. The set of model generations can represent a performance differentiation compared to other ones of the respective service classes.

The machine learning component 1802 can utilize machine learning systems that have been explicitly or implicitly trained to learn, determine or infer system (or entity) needs, capacity requirements, interdependencies of resources, and dynamically determine or infer model representations that achieve current and/or anticipated system/capacity requirements related to quality of service, a target utilization rate, a slowdown performance tolerance level, and so on. It is to be appreciated that machine learning systems can be implemented in one or more of the components to generate explicitly and/or implicitly trained models that provide the desired models to represent performance of resources employed to provide respective functions. The machine learning systems can learn systems, networks, etc., identify interdependencies of respective resources and correlations in order to determine or infer performance models that conform to actual usage that mitigates downtime and reliably achieves system (or entity) objectives.

With continuing reference to FIG. 18, a conceal component 1804 can hide performance characteristic of the computing infrastructure from an entity of the one or more resources available for the allocation. In some implementations, the system 1800 can be implemented on the computing infrastructure. However, in other implementations, the system 1800 can be implemented on another device, such as a device associated with a service entity or a third-party that has a trusted relationship with the computing infrastructure.

Based on results of the models generated by the modeling component 202, the recommendation component 204 can output 112 one or more suggested bid values that correspond to respective service level agreements. The bid advisor engine 102 can receive a selection of one of the suggested bid values and an allocation component 1806 can allocate the resource or more than one resource.

Figure 19:
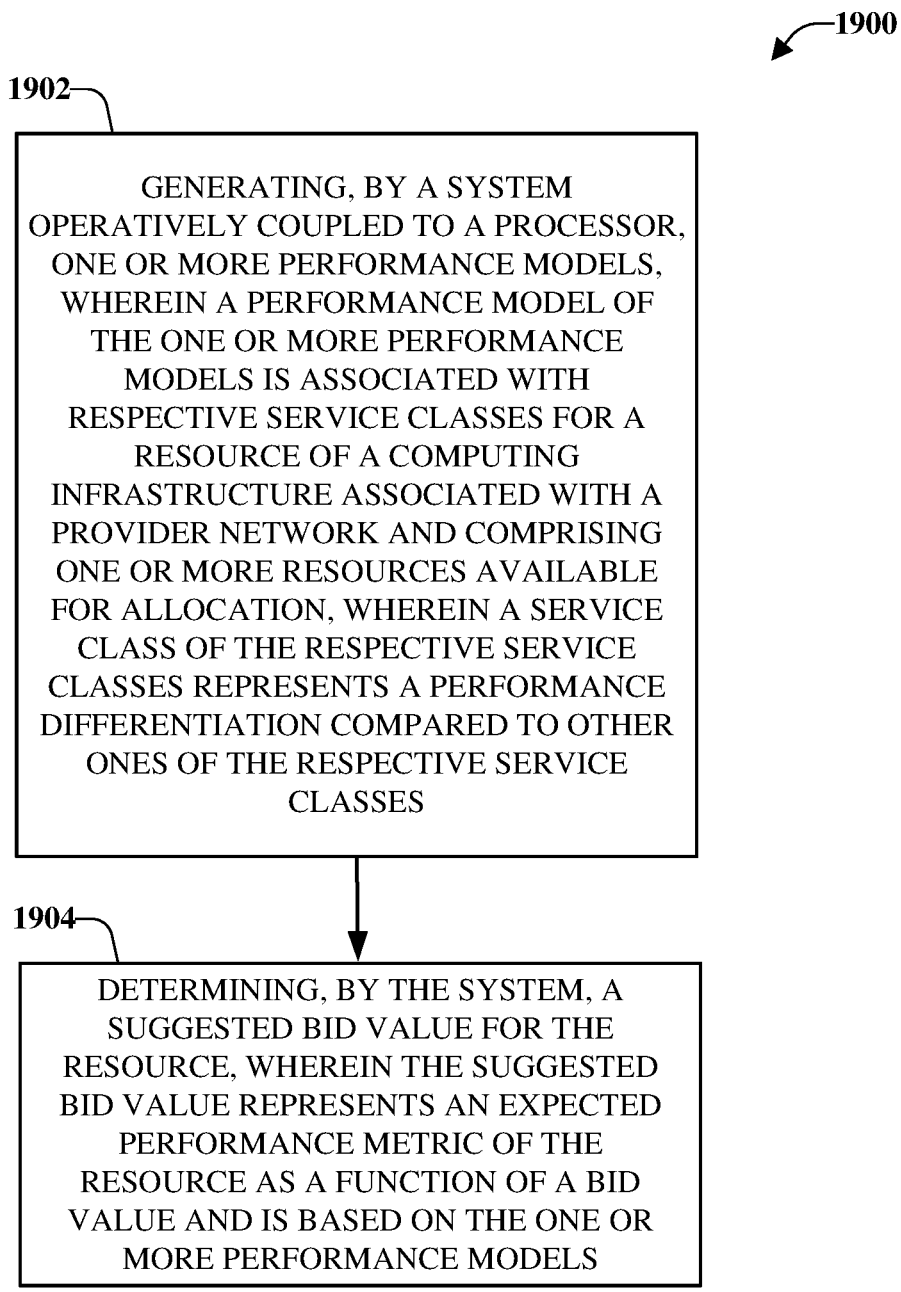
FIG. 19 illustrates a flow diagram of an example, non-limiting computer-implemented method that facilitates bid advising in resource allocation data analytics frameworks in accordance with one or more embodiments described herein.

FIG. 19 illustrates a flow diagram of an example, non-limiting computer-implemented method 1900 that facilitates bid advising in resource allocation data analytics frameworks in accordance with one or more embodiments described herein. At 1902, a system operatively coupled to a processor generates one or more performance models (e.g., via the modeling component 202). The performance model of the one or more performance models can be associated with respective service classes for a resource of a computing infrastructure associated with a provider network. The provider network can include one or more resources available for allocation. A service class of the respective service classes can represent a performance differentiation compared to other ones of the respective service classes. At 1904, the system determines a suggested bid value for the resource (e.g., via a recommendation component 204). The suggested bid value represents an expected performance metric of the resource as a function of a bid value and can be based on the one or more performance models.

Figure 20:
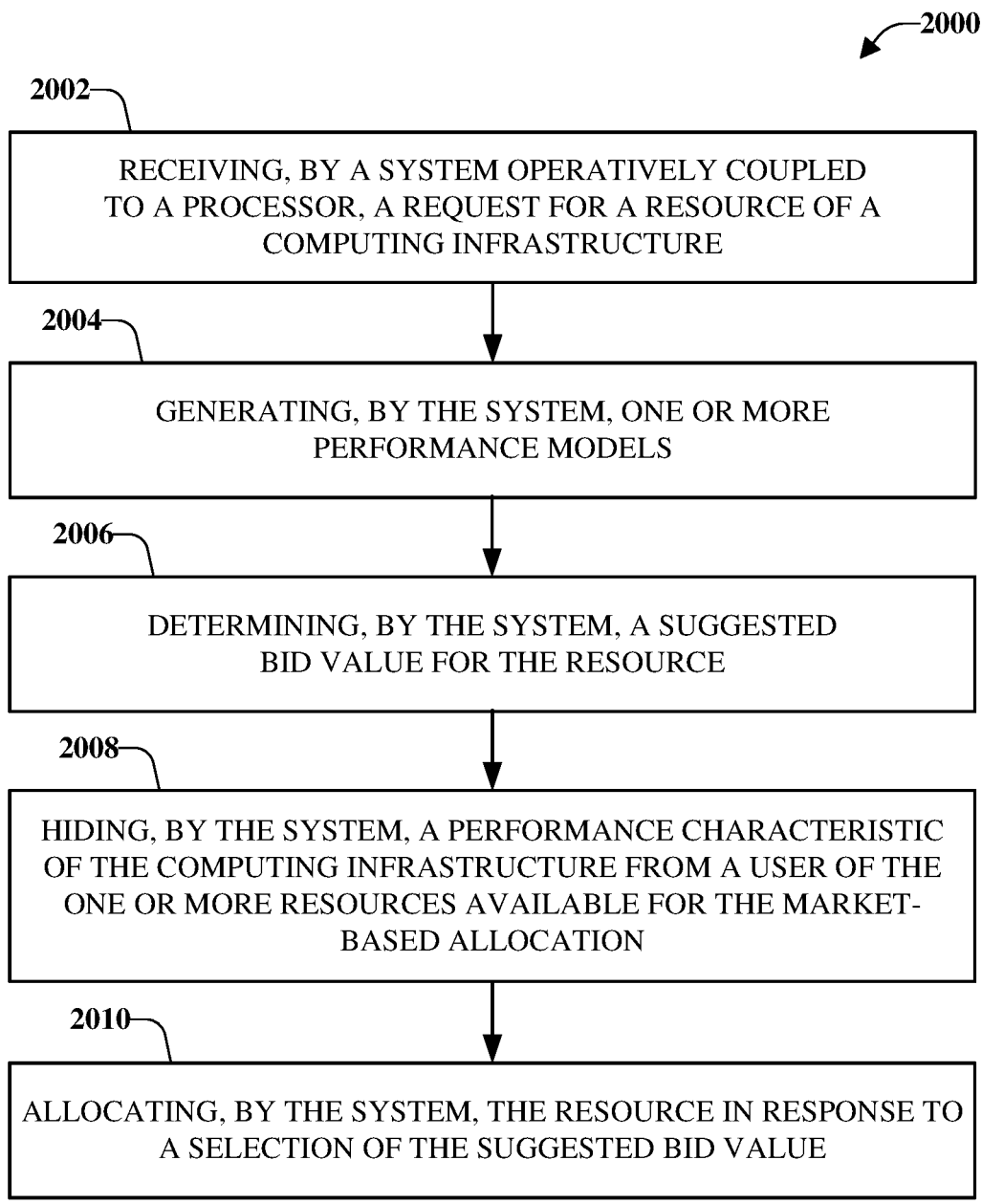
FIG. 20 illustrates a flow diagram of an example, non-limiting computer-implemented method that facilitates a recommended bid price for resource allocation in accordance with one or more embodiments described herein.

FIG. 20 illustrates a flow diagram of an example, non-limiting computer-implemented method 2000 that facilitates a recommended bid price for resource allocation in accordance with one or more embodiments described herein. At 2002, a system operatively coupled to a processor receives a request for a resource of a computing infrastructure (e.g., via the bid advisor engine 102). The request can comprise a tolerance level for the resource. In an example, the tolerance level can be selected from a group of tolerance levels comprising a slowdown rate and a budget constraint. At 2004, the system generates one or more performance models (e.g., via the modeling component 202). Generating the one or more performance models can comprise generating at least two performance models comprising respective service level agreements related to a slowdown rate. A performance model of the one or more performance models can be associated with respective service classes for a resource of a computing infrastructure associated with a provider network that comprises one or more resources available for allocation. Further, a service class of the respective service classes represents a performance differentiation compared to other ones of the respective service classes. The respective service classes represent different service level agreements for the one or more resources At 2006, the system determines a suggested bid value for the resources (e.g., via the recommendation component 204). The suggested bid value represents an expected performance metric of the resource as a function of a bid value and can be based on the one or more performance models. According to an implementation, determining the suggested bid value can comprise evaluating the performance model of the one or more performance models for conformance to a target utilization rate. According to another implementation, determining the suggested bid value can comprise evaluating the performance model of the one or more performance models for conformance to a slowdown performance tolerance level. According to another implementation, determining the suggested bid value can comprise generating a first bid value comprising a first service level agreement and a second bid value comprising a second service level agreement. In accordance with another embodiment, determining the suggested bid value for the resource comprises increasing a processing speed of usage of the resource. At 2008, the system hides a performance characteristic of the computing infrastructure from an entity of the one or more resources available for the allocation (e.g., via the conceal component 1804). At 2010, the system allocates the resource in response to a selection of the suggested bid value (e.g., via the allocation component 1806).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 21:
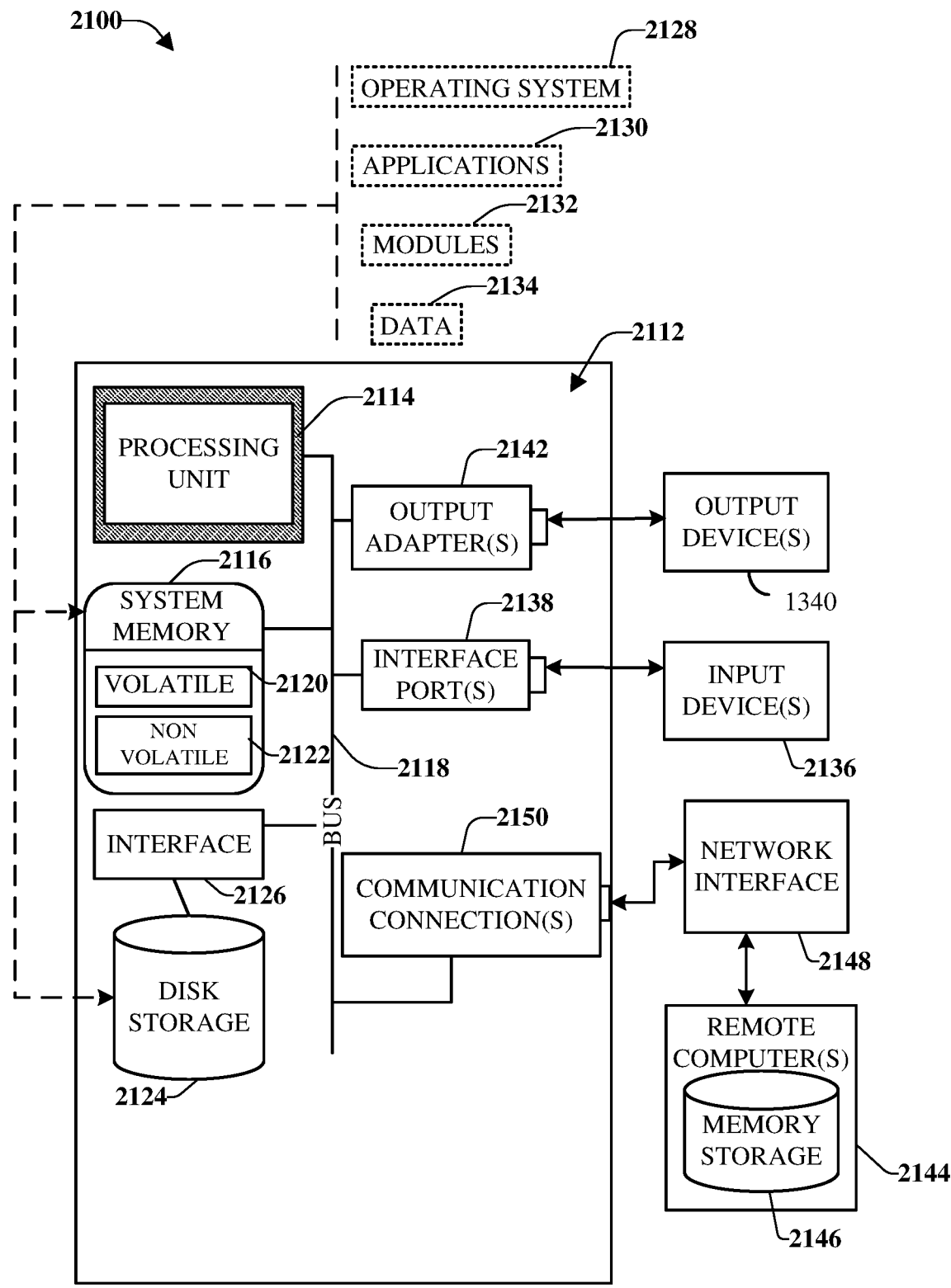
FIG. 21 illustrates a block diagram of an example, non-limiting operating environment in which one or more embodiments described herein can be facilitated.

In order to provide a context for the various aspects of the disclosed subject matter, FIG. 21 as well as the following discussion are intended to provide a general description of a suitable environment in which the various aspects of the disclosed subject matter can be implemented. FIG. 21 illustrates a block diagram of an example, non-limiting operating environment in which one or more embodiments described herein can be facilitated. Repetitive description of like elements employed in other embodiments described herein is omitted for sake of brevity. With reference to FIG. 21, a suitable operating environment 2100 for implementing various aspects of this disclosure can also include a computer 2112. The computer 2112 can also include a processing unit 2114, a system memory 2116, and a system bus 2118. The system bus 2118 couples system components including, but not limited to, the system memory 2116 to the processing unit 2114. The processing unit 2114 can be any of various available processors. Dual microprocessors and other multiprocessor architectures also can be employed as the processing unit 2114. The system bus 2118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 2116 can also include volatile memory 2120 and nonvolatile memory 2122. The basic input/output system (BIOS), containing the basic routines to transfer information between elements within the computer 2112, such as during start-up, is stored in nonvolatile memory 2122. By way of illustration, and not limitation, nonvolatile memory 2122 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 2120 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 2112 can also include removable/non-removable, volatile/nonvolatile computer storage media. FIG. 21 illustrates, for example, a disk storage 2124. Disk storage 2124 can also include, but is not limited to, devices like a magnetic disk drive, floppy disk drive, tape drive, Jaz drive, Zip drive, LS-100 drive, flash memory card, or memory stick. The disk storage 2124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 2124 to the system bus 2118, a removable or non-removable interface is typically used, such as interface 2126. FIG. 21 also depicts software that acts as an intermediary between users and the basic computer resources described in the suitable operating environment 2100. Such software can also include, for example, an operating system 2128. Operating system 2128, which can be stored on disk storage 2124, acts to control and allocate resources of the computer 2112. System applications 2130 take advantage of the management of resources by operating system 2128 through program modules 2132 and program data 2134, e.g., stored either in system memory 2116 or on disk storage 2124. It is to be appreciated that this disclosure can be implemented with various operating systems or combinations of operating systems. A user enters commands or information into the computer 2112 through input device(s) 2136. Input devices 2136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2114 through the system bus 2118 via interface port(s) 2138. Interface port(s) 2138 include, for example, a serial port, a parallel port, a game port, and a universal serial bus (USB). Output device(s) 2140 use some of the same type of ports as input device(s) 2136. Thus, for example, a USB port can be used to provide input to computer 2112, and to output information from computer 2112 to an output device 2140. Output adapter 2142 is provided to illustrate that there are some output devices 2140 like monitors, speakers, and printers, among other output devices 2140, which require special adapters. The output adapters 2142 include, by way of illustration and not limitation, video and sound cards that provide a means of connection between the output device 2140 and the system bus 2118. It should be noted that other devices and/or systems of devices provide both input and output capabilities such as remote computer(s) 2144.

Computer 2112 can operate in a networked environment using logical connections to one or more remote computers, such as remote computer(s) 2144. The remote computer(s) 2144 can be a computer, a server, a router, a network PC, a workstation, a microprocessor based appliance, a peer device or other common network node and the like, and typically can also include many or all of the elements described relative to computer 2112. For purposes of brevity, only a memory storage device 2146 is illustrated with remote computer(s) 2144. Remote computer(s) 2144 is logically connected to computer 2112 through a network interface 2148 and then physically connected via communication connection 2150. Network interface 2148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 2150 refers to the hardware/software employed to connect the network interface 2148 to the system bus 2118. While communication connection 2150 is shown for illustrative clarity inside computer 2112, it can also be external to computer 2112. The hardware/software for connection to the network interface 2148 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. The characteristics are as follows: on-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a high level of abstraction (e.g., country, state, or data center). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of selected networking components (e.g., host firewalls).

Deployment Models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 22:
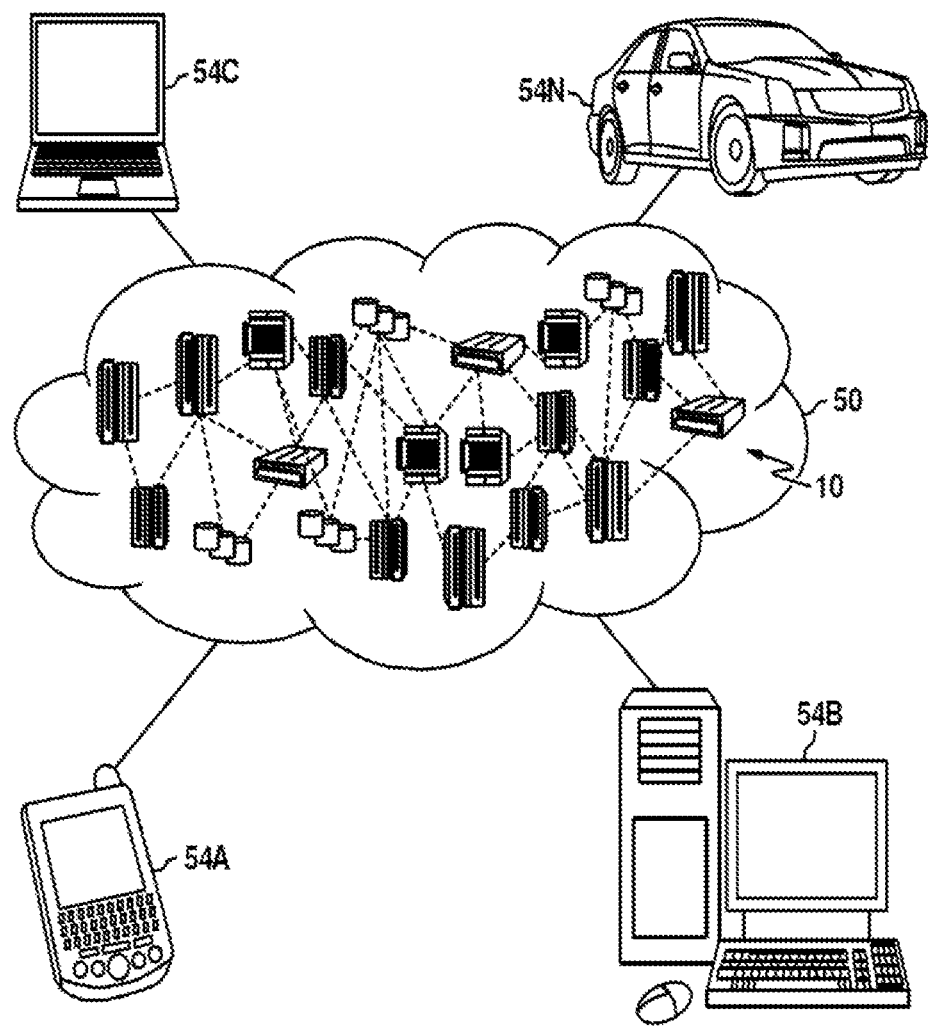
FIG. 22 depicts a cloud computing environment according to an embodiment of the present invention.

Referring now to FIG. 22, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 22 are intended to be illustrative only and that computing nodes 10 and cloud computing environment 50 can communicate with any type of computerized device over any type of network and/or network addressable connection (e.g., using a web browser).

Figure 23:
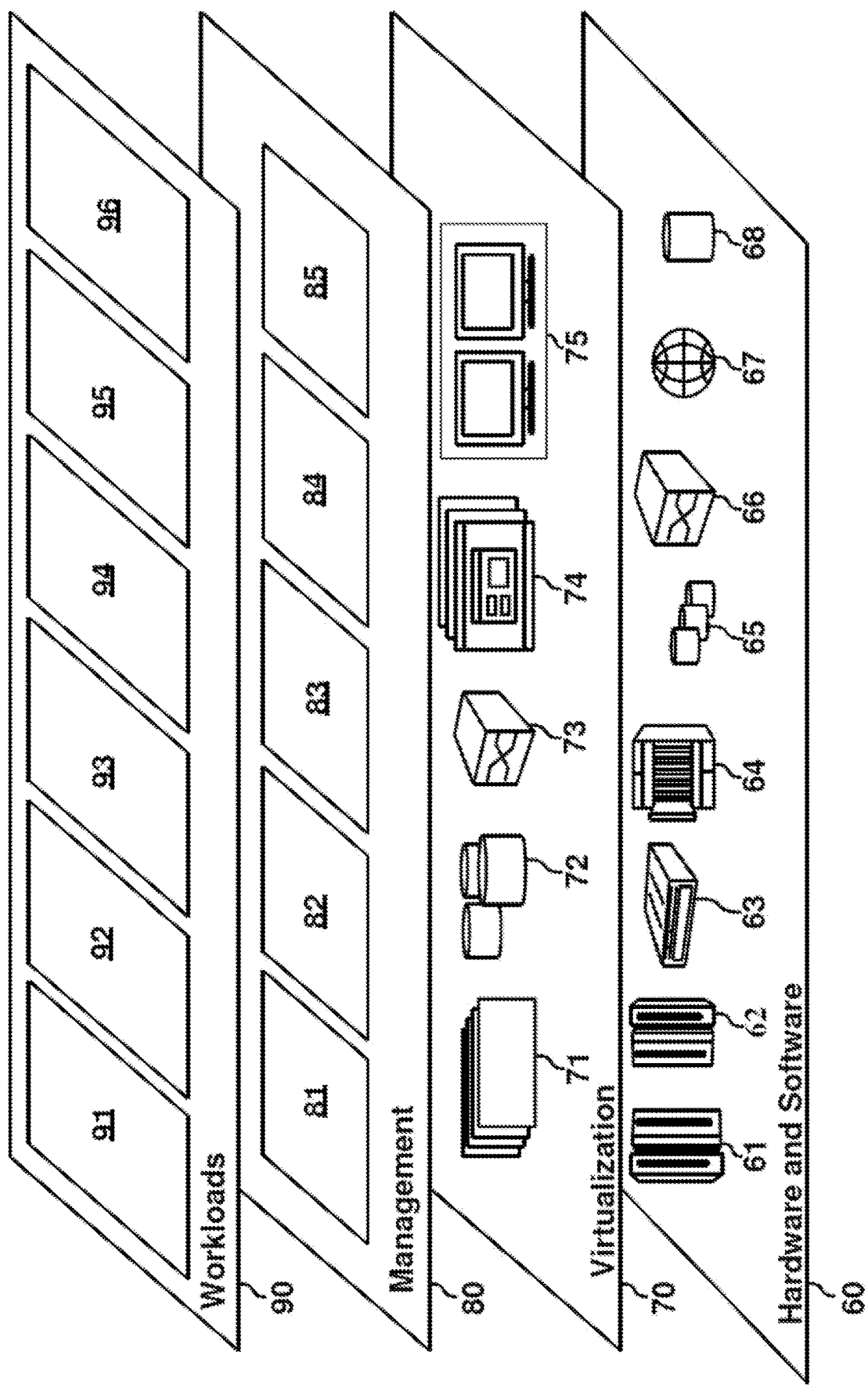
FIG. 23 depicts abstraction model layers according to an embodiment of the present invention.

Referring now to FIG. 23, a set of functional abstraction layers provided by cloud computing environment 50 (FIG. 22) is shown. It should be understood in advance that the components, layers, and functions shown in FIG. 23 are intended to be illustrative only and embodiments of the invention are not limited thereto. As depicted, the following layers and corresponding functions are provided: Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, the procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and estimating node processing capacity values for order fulfillment 96.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   generating, by a system operatively coupled to a processor, one or more performance models, wherein a performance model of the one or more performance models is associated with respective service classes for a resource of a computing infrastructure associated with a provider network and comprising one or more resources available for allocation, wherein a service class of the respective service classes represents a performance differentiation compared to other ones of the respective service classes; and
   determining, by the system, based on the one or more performance models, a suggested bid value for the resource that a bidding entity is recommended to bid for the resource to mitigate preemption by other bidding entities according to a defined tolerance level for a slowdown rate of the resource for the bidding entity.

2. The computer-implemented method of claim 1, wherein the determining the suggested bid value comprises evaluating the performance model of the one or more performance models for conformance to a target utilization rate.

3. The computer-implemented method of claim 1, wherein the determining the suggested bid value comprises evaluating the performance model of the one or more performance models for conformance to the defined tolerance level for the slowdown rate.

4. The computer-implemented method of claim 1, further comprising:
   allocating, by the system, the resource in response to a selection of the suggested bid value.

5. The computer-implemented method of claim 1, wherein a performance characteristic of the computing infrastructure is hidden from an entity of the one or more resources available for the allocation.

6. The computer-implemented method of claim 1, wherein the respective service classes represent different service level agreements for the one or more resources.

7. The computer-implemented method of claim 1, wherein the generating the one or more performance models comprises generating at least two performance models comprising respective service level agreements related to the slowdown rate.

8. The computer-implemented method of claim 1, wherein the determining the suggested bid value comprises generating a first bid value representing a first service level agreement and a second bid value representing a second service level agreement.

9. The computer-implemented method of claim 1, further comprising receiving, by the system, a request for the resource of the computing infrastructure, wherein the request comprises a tolerance level for the resource.

10. The computer-implemented method of claim 9, wherein the tolerance level is selected from a group of tolerance levels comprising the slowdown rate and a budget constraint.

11. The computer-implemented method of claim 1, wherein the determining the suggested bid value for the resource comprises increasing a processing speed of usage of the resource.

12. The computer-implemented method of claim 1, wherein the system is implemented on the computing infrastructure.

* * * * *